Sept. 26, 1967  A. J. GIRARD  3,343,446
OPTICAL ELEMENT UTILIZABLE AS ENTRANCE OR EXIT GATE
FOR SPECTROMETRIC APPARATUS
Filed Feb. 27, 1962  14 Sheets-Sheet 1
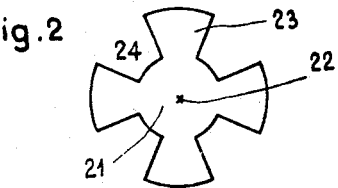
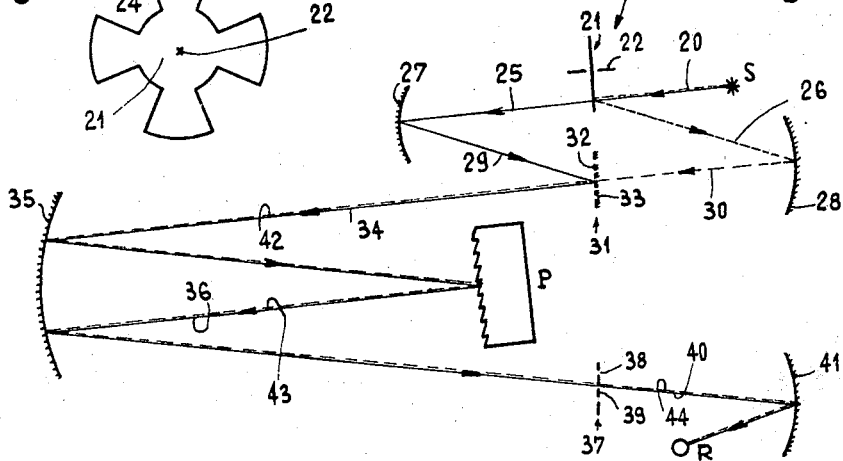
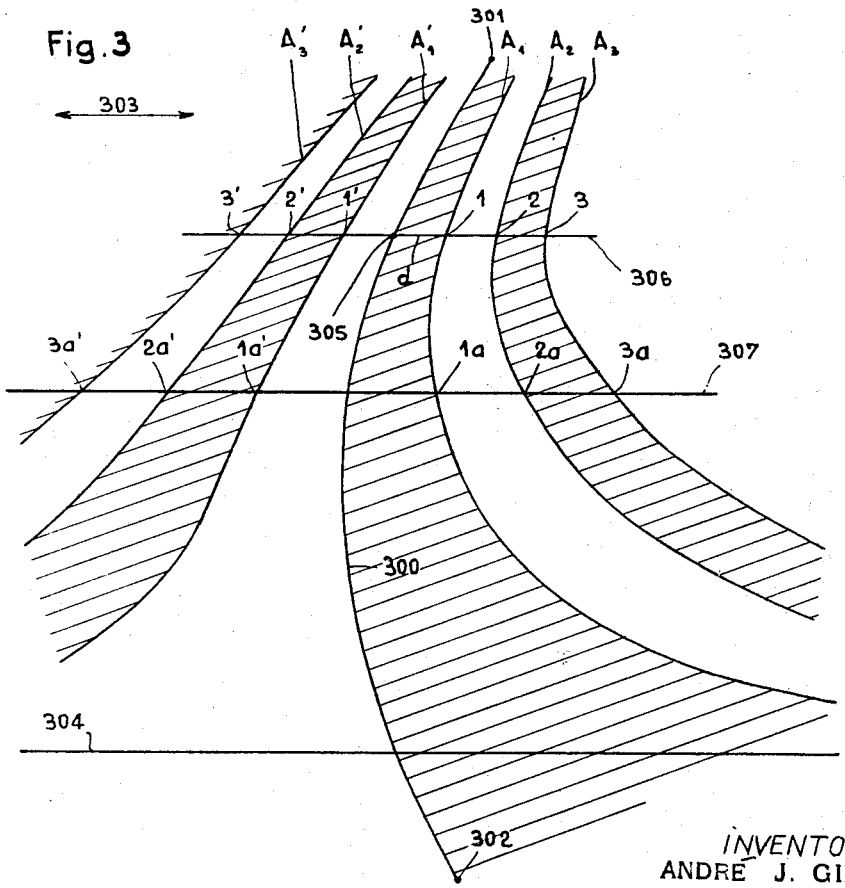
INVENTOR.
ANDRÉ J. GIRARD.
BY
Karl F. Ross Sept. 26, 1967  A. J. GIRARD  3,343,446
OPTICAL ELEMENT UTILIZABLE AS ENTRANCE OR EXIT GATE
FOR SPECTROMETRIC APPARATUS
Filed Feb. 27, 1962  14 Sheets-Sheet 3

INVENTOR
ANDRÉ J. GIRARD.
BY
Karl F. Ross

INVENTOR
ANDRÉ J. GIRARD.
BY Karl F. Ross

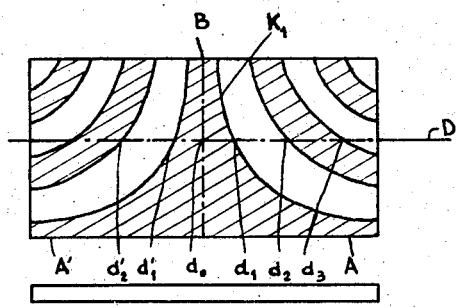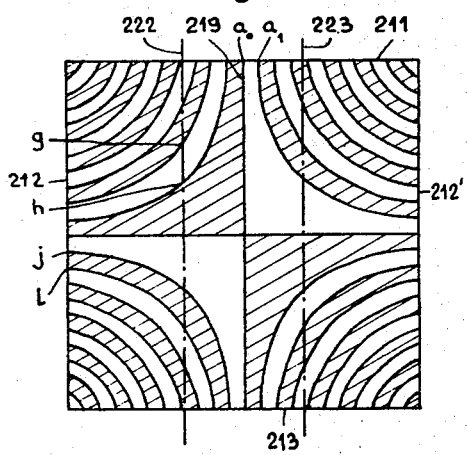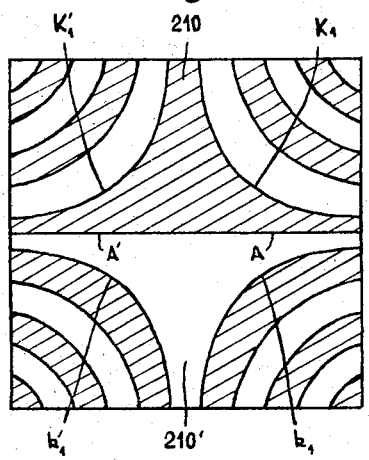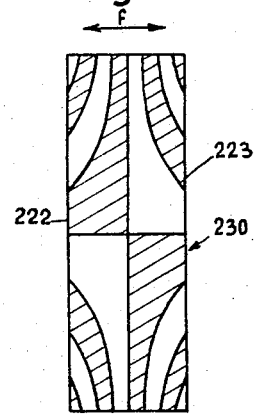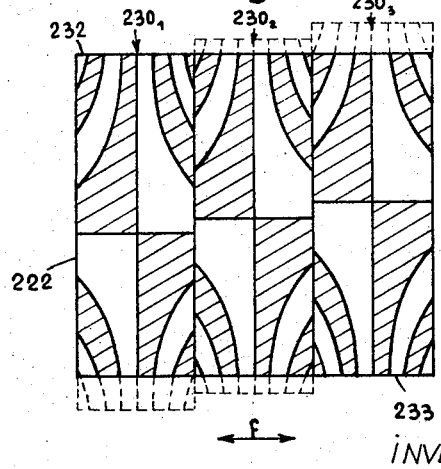

INVENTOR
ANDRÉ J. GIRARD.
BY
Karl F. Ross

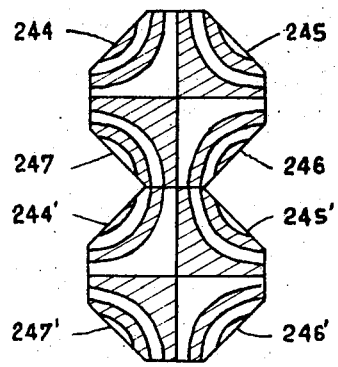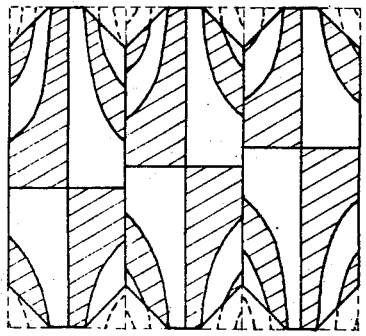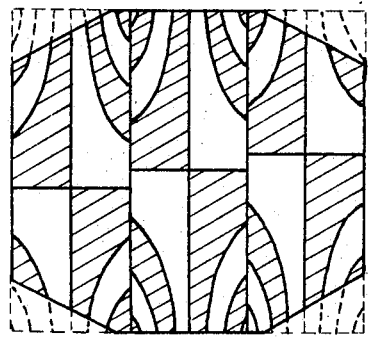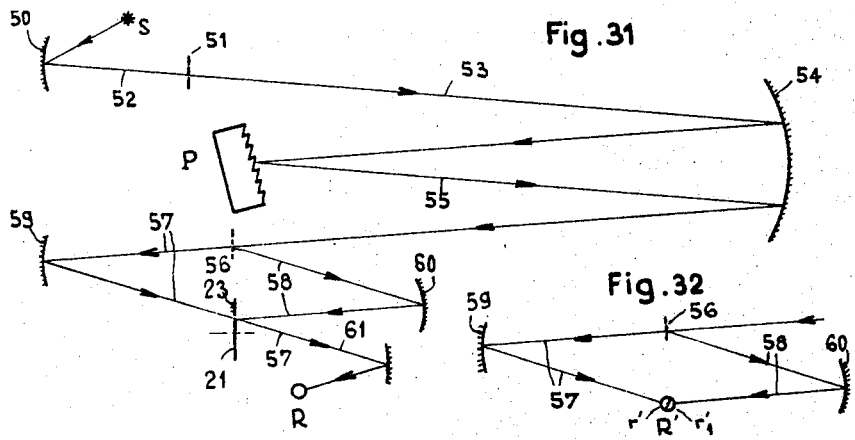

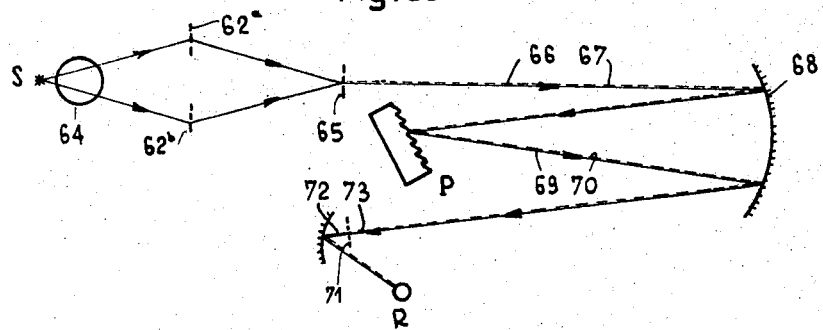
Fig. 33
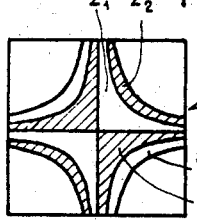
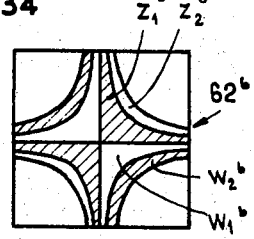
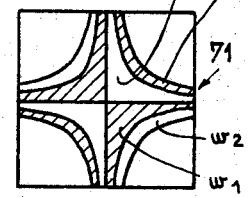
Fig. 34    Fig. 35
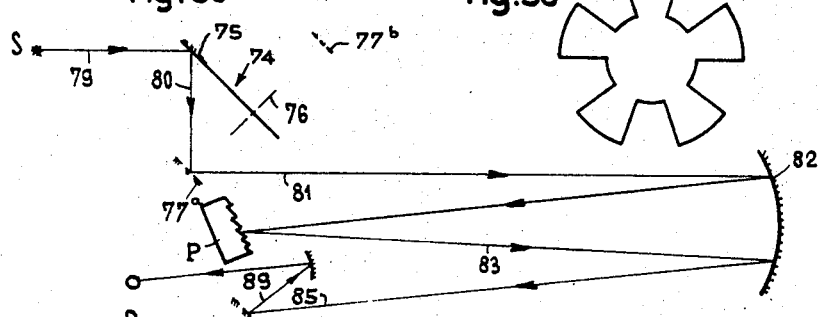
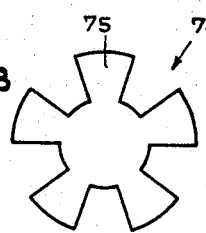
Fig. 36    Fig. 38
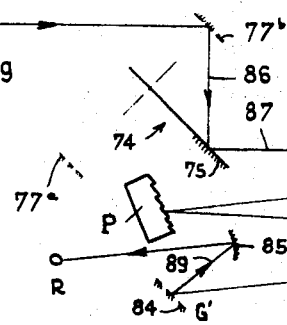
Fig. 37
INVENTOR
ANDRÉ J. GIRARD.
BY Karl F. Ross Sept. 26, 1967            A. J. GIRARD          3,343,446
OPTICAL ELEMENT UTILIZABLE AS ENTRANCE OR EXIT GATE
FOR SPECTROMETRIC APPARATUS
Filed Feb. 27, 1962                              14 Sheets-Sheet 9
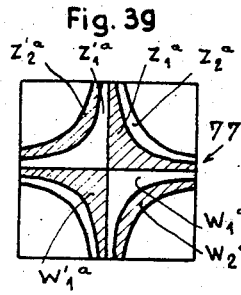
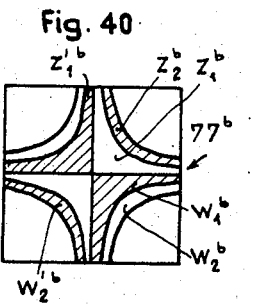
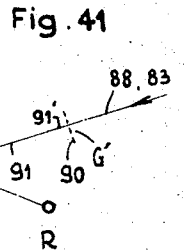
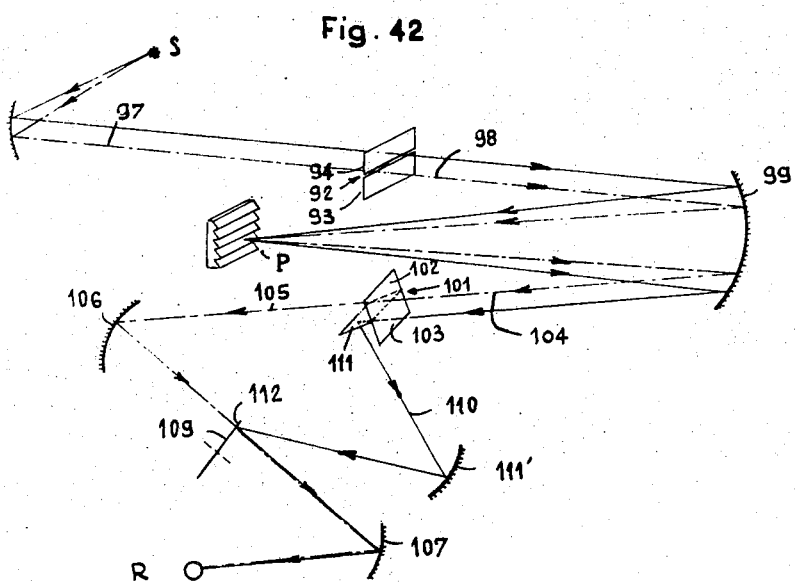
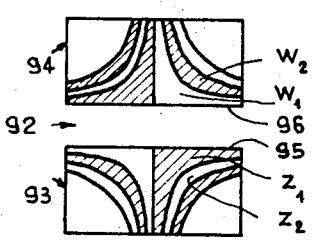
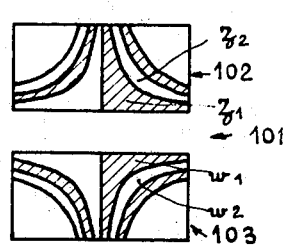
INVENTOR
ANDRÉ J. GIRARD
BY
Karl F. Ross

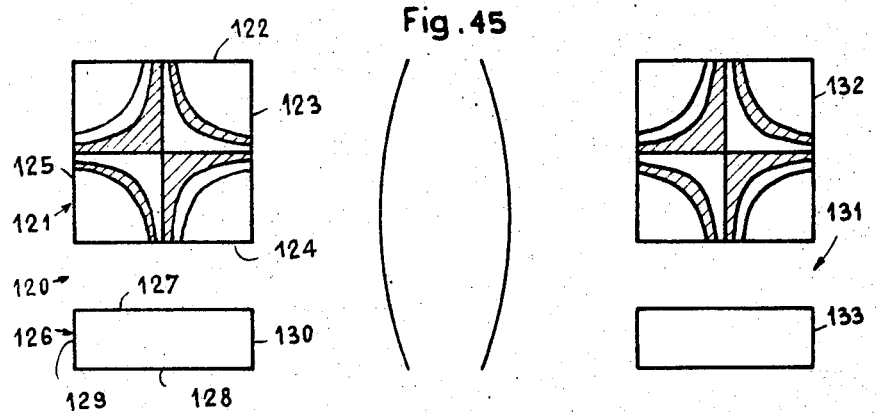
Fig. 45
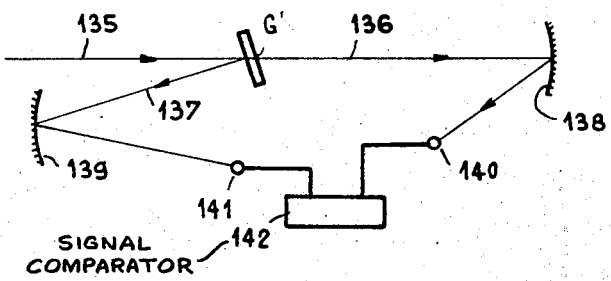
Fig. 46
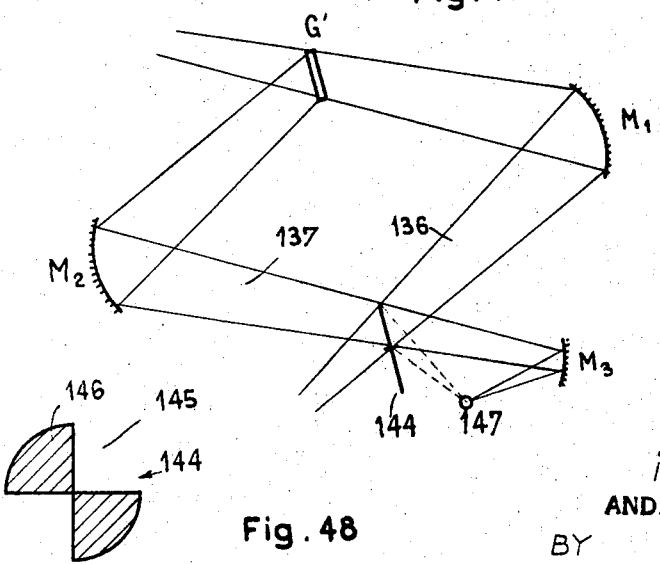
Fig. 47
Fig. 48

Fig. 50
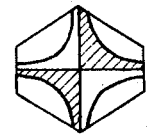
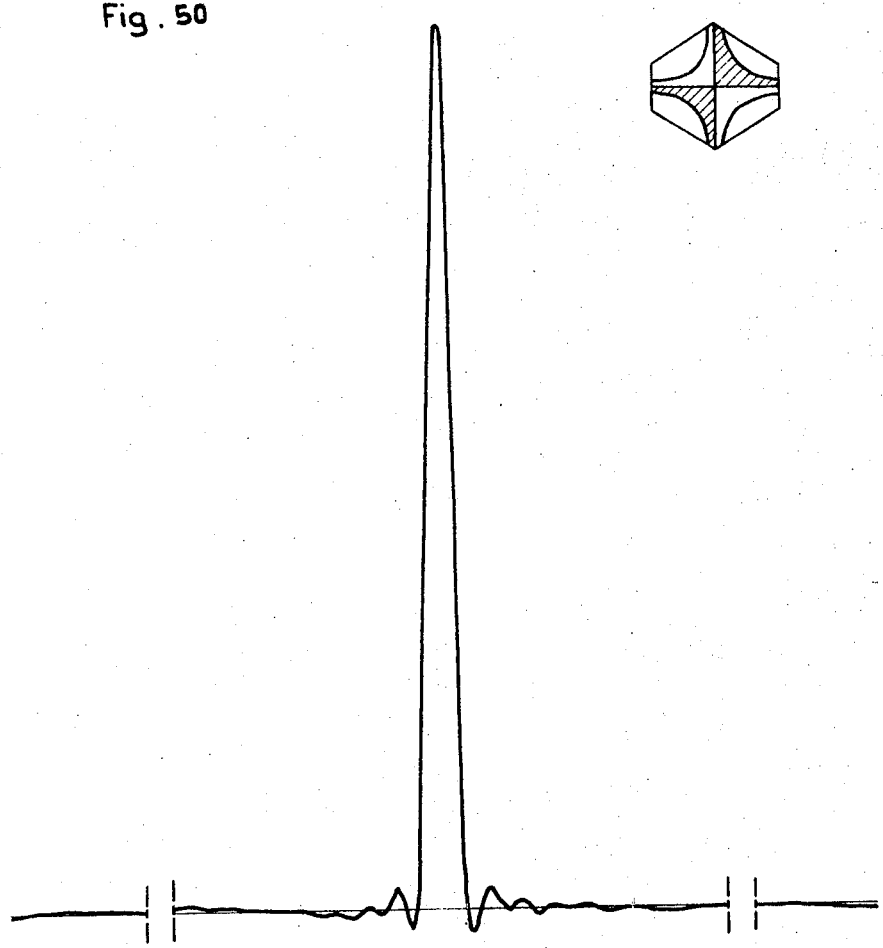

United States Patent Office 3,343,446
Patented Sept. 26, 1967

---

3,343,446
OPTICAL ELEMENT UTILIZABLE AS ENTRANCE OR EXIT GATE FOR SPECTROMETRIC APPARATUS
André Jean Girard, Chatillon-sous-Bagneux, Seine, France, assignor to Office National d'Etudes et de Recherches Aero-Spatiales
Filed Feb. 27, 1962, Ser. No. 175,911
Claims priority, application France, Apr. 21, 1961, 859,532; Oct. 12, 1961, 875,743
38 Claims. (Cl. 88—14)

Slit spectrometers have been known for a long time; in instruments of this type a slot is disposed on either side of a dispersive system, such as a prism or grating, the radiation flux to be analyzed entering through an entry slot while the separated part of the flux issues through an exit slot, which coincides with the image projected by the entry slot through the spectrometer, and is directed towards a receiver. Since the resolving power of such a spectrometer is substantially inversely proportional to the width of the entry slot, the same must be very narrow if a spectrometer having any pretensions to high resolving power is required; consequently, the amount of radiant energy passing through the spectrometer is, relatively speaking, very reduced, a state of affairs which is sometimes described by saying that apparatus of this kind has a low luminosity.

In an effort to obviate this disadvantage, it has been conventional for some time to use a spectrometer input element formed with a large number of parallel slits extending in a direction perpendicular to the direction of spread of the spectrum, but this step leads to fresh difficulties which have prevented the idea from coming into widespread practical use.

This invention relates to a device adapted to be placed as an entrance or exit gate in a radiation flux to separate the same into two separate and differently directed fluxes, the difference between the two fluxes being brought about by their different paths or being achieved by attenuation of one of the two fluxes relatively to the other up to, in some cases, complete cancellation, (i.e., non-transmission) of one of the two fluxes.

The invention is of use in spectrometry, particularly in conjunction with apparatus of the general type described in my copending application Ser. No. 21,690 filed May 25, 1960. This spectrometric apparatus comprises an entrance gate or device at its input and an exit gate or device superimposed to coincide with the image projected by the input device through the apparatus with a particular operating wavelength, the spectrometric information being supplied by comparison of the two partial fluxes which exist beyond the exit device. The present improvement relates to the construction of the entrance and exit devices.

A spectrometric apparatus comprising an entry device and an exist device according to the invention provides a first partial flux which transmits half the energy, on a predetermined wavelength, of the flux incident upon the entry device and which transmits a substantially smaller proportion—one quarter or less—on the energies of such flux on each wavelength issuing from the apparatus other than the said predetermined wavelength. The apparatus also provides a second partial flux which transmits a similarly reduced proportion—one quarter or less—of the energies on each of the said other wavelengths incident on the entry device to the exclusion of energy on the predetermined operating or control wavelength; this energy transmitted on the control wavelength can be found by a comparison of the fluxes and by differentiation of the energies transmitted on each flux, there being no need to use the method of strict spatial separation as used in slit spectrometers.

The invention more specifically relates to an entry device and to an exit device each comprising a flat body whose surface is divided into two sets of alternate adjacent zones, the zones of one set causing the light beams incident upon them to travel in a different way as compared with the zones of the other set, the exit device being coincidently superimposed zone for zone upon the image of the entry device which, at the control wavelength, is projected by a chromatically dispersive optical system dispersed between the entry device and the exit device, the spectrometric signal being the result of comparison of the said partial fluxes.

It is an object of the invention to provide a device which, when used as hereinbefore described at the entry and exit of a spectrometric apparatus, imparts to the instrument special qualities which increase its possible uses. Another object of the inventon is to provide a spectrometric apparatus wherein the distribution of the energies hereinbefore specified is maintained over the whole radiation-spectrum range for which the apparatus can be used. It is therefore also an object of the invention to provide a spectrometric apparatus wherein, from a radiation flux passing through the entry device, the energy of the control wavelength resulting from the position of the dispersive system is transmitted substantially without attenuation, whereas the energy on any other wavelength than the control wavelength has substantially no effect on the signal delivered by the apparatus.

It is a further object of the invention to provide an apparatus having the quality of a conventional slit spectrometer with a single entry slit and a single exit slit, both of them very narrow, but with an incomparably (several hundreds of times) greater luminosity than can be provided by a conventional apparatus, the generating energy of the signal being half of the energy incident on the entry device whose area can be the available field area limited only by the geometric aberrations of the optical system of the apparatus.

It is still another object of the invention to provide an apparatus of the kind specified which, in addition to having the qualities hereinbefore set forth, can be so adapted, by an appropriate entry device and an appropriate exit device, as to provide any resolving power within the range of an apparatus having a single entry slit and a single exit slit.

These results are achieved by entry and exit devices distinguished by the shape of the boundaries of the adjacent zones causing different modes of propagation for an incident flux.

If the different transmission effect is achieved, for instance, by placing an opaque non-reflecting zone or a reflecting zone adjacent a transparent zone, the entry and exit devices according to the invention are distinguished by the shape of the lines separating, for instance, a transparent zone from an adjoining opaque and/or reflecting zone or, in other instances an opaque zone from a reflecting zone.

According to the invention, the boundary lines between adjacent zones are curves so shaped that in an entry device and/or an exit device—the total of the areas of the zones of one set being equal to the total of the areas of the zones of the other set, with allowance, where necessary, for the presence of a complementary correcting surface—there exists on the entry device and the exit device at least one portion where, along a line extending in a predetermined direction which will be called the "basic direction" hereinafter, the consecutive zone-bounding curves are spaced at a very small distance or interval apart from one another, and there exists at least one other portion where, along another line parallel to the same direction, the curves are considerably farther apart from one another—by a factor of at least one hundred times—than in the first portion, the spacing of the curves varying (i.e. increasing) non-linearly between those portions.

As many families of curves—actually an infinite number thereof—meet the definition just given, persons skilled in the art can construct entry and exit devices very well adapted to particular purposes.

The invention, in one of its aspects relates to an embodiment of a gate device wherein the zones of the two sets are bounded by hyperbolic curves having common asymptotes or pseudo-asymptotes (i.e. lines tangent thereto at very remote points so as to approximate asymptotes), one of which extends in the basic direction and the other of which extends, in a preferred embodiment, of the invention, perpendicularly to the basic direction, the consecutive hyperbolic curves cutting off equal portions along any straight line parallel to the basic direction.

The invention relates more particularly to an embodiment wherein the zone-bounding curves of both sets are hyperbolic curves, whose branches are substantially parallel both to the basic direction and to a straight line extending transversely thereof.

In a preferred form of the invention, the zone-bounding curves of the two sets are hyperbolae having the same asymptotes, one of the asymptotes being parallel to the basic direction, while the other asymptote can be oriented in any way relatively to the basic direction. For use in spectrometry, optimum results are achieved when one of the asymptotes parallel to the basic direction extends in the direction of spectrum spread, any straight line parallel to that asymptote being cut into equal portions by the hyperbolae.

A first set of zones of the exit device can coincide with the images of a first set of zones of the entry device, and the zones second set of the exit device then coincide with the images of the second set of zones of the entry device; alternatively, the first set of zones of the exit device may coincide with the images of the second set of zones of the entry device, and the second set of zones of the exit device will then coincide with the images of the first set of zones of the entry device.

In one advantageous embodiment, the entry element and the exit element are centrally symmetrical, the center of symmetry being the point where the perpendicular asymptotes meet—in the case where the zone-bounding curves form families of equilateral hyperbolae—so that an entry or exit element has a rectangular, advantageously square, contour with curves in the four quadrants defined by the asymptotes from the center of symmetry.

The invention covers other embodiments of an entry or exit device wherein the zones for differentiating between the transmissions of radiation beams are bounded by hyperbolic curves, such as the case where the curves are hyperbolae and the entry or exit element bounded by parallels to the semi-asymptotes, including the semi-asymptotes themselves or a proportion thereof, and forming a parallelogram or a rectangle, the zone boundaries being formed by the branches of hyperbolae contained in such parallelogram or rectangle and cutting off equal sections on straight lines parallel to the basic direction which is the direction of a semi-asymptote.

The invention further relates to an embodiment wherein the two sets of zones of each of the entry and exit elements just defined are complemented by a correcting zone whose transmission effect is of the same kind as the transmission effect of the set of zones having the lowest total of areas, the surface of the correcting zone being equal to the difference between the totals of the areas of the two sets of zones.

The invention also relates to an entry or exit device formed by two associated quadrants, the second quadrant being symmetrical of the first relatively to any of the sides thereof, the zones of the second quadrant being respectively of a different nature, so far as their transmission characteristic is concerned, from the zones to which they are symmetrical.

The invention also covers embodiments comprising four quadrants, two of which are as just described while the other two are obtained by symmetrical reproduction from the first two.

The curves bounding adjacent zones in the pattern of a gate element according to the invention may be traced by starting from a directrix curve (which can in principle be any curve provided that it is devoid, in the part used, of any tangent parallel to a selected basic direction) and plotting on each of several straight lines parallel to the basic direction, intersecting different parts of the curve, equal portions whose length increases with decreasing distance of the respective intersecting line from a reference straight line parallel to the chosen basic direction hereinbefore referred to, the variation of their length in dependence upon said distance being advantageously non-linear, and in then joining together the ends of like rank of the sections thus bounded on the several parallel lines.

The starting or directrix curve can be a hyperbolic curve, e.g. an equilateral hyperbola, in which event the law of variation of the lengths of the sections can be graphically represented, in a system utilizing the reference line as one of two co-ordinate axes, as a curve of the same kind as the directrix curve.

In the preferred case in which the direction is an equilateral hyperbola, the length of any section along each of the straight lines intersecting the directrix may be equal to the length of the section bounded on the respective line by the directrix and the asymptote transverse to the basic direction.

The invention, however, also invisages an embodiment wherein the length of the sections marked on any straight line parallel to the basic direction is equal to twice the length of the section bounded on the respective line by the directrix curve and its asymptote transverse to that direction. In this embodiment the asymptote transverse to the direction is not a boundary between two zones of different transmissivity.

More generally, the function representing the variation of section length with the distance from the reference line follows a hyperbolic law expressed as a multiple of the function which is graphically represented by the directrix hyperbola.

A device constructed as hereinbefore described can be placed at the entry of a spectrometry apparatus with its basic direction oriented in any way relatively to the direction of spectrum spread provided by the appartus, the exit device being so disposed as to be coincident with a monochromatic image of the entry device projected by the apparatus.

In a preferred application, the entry device is so placed that its basic direction, for instance, an asymptote or pseudo-asymptote of the family of hyperbolae or hyperbolic curves, is parallel to the direction of spectrum spread provided by the dispersing system.

The invention also encompasses embodiments wherein the hyperbolae or hyperbolic curves which bound the two sets of zones, instead of cutting off equal sections of straight lines parallel to the basic direction, cut off sections which are unequal in particular ways, the construction of this kind being used, for instance, where the transmission factors associated with the two sets of zones do not respectively correspond to total transparency and total opacity.

The invention also relates to embodiments of apparatus comprising a number of entry devices and/or of exit devices operative simultaneously and/or alternately, each such device having its zones bounded by curves as hereinbefore set forth.

A spectrometry apparatus comprising one or more entry devices according to the invention and one or more exit devices coincident with the image of the latter is used in association with a receiver sensitive to the flux transmitted to it by each exit device. In this connection, a spectrometry apparatus according to the invention can be constructed which can be used in association with two receivers followed by means for comparing the indications provided by these receivers. Also, an apparatus according to the invention can be constructed for use with a differential receiver, i.e., a receiver comprising a first part receiving an exit beam and a second part simultaneously receiving another exit beam, the receiver comparing the energies transmitted on the two beams. Alternatively, an apparatus according to the invention can be constructed for use with a non-differential receiver which is supplied in a periodic sequence with a first beam and with a second beam transmitted to it by each exit device, means being provided beyond the receiver to differentiate between the alternate signals.

In this respect the invention provides different embodiments of entry and exit devices for producing the two beams either simultaneously or consecutively.

The invention moreover provides embodiments in which the contour of the entry and exit elements is formed by portions of straight lines parallel and perpendicular to the spectrum-spread direction, and the invention also contemplates variants with a different contour which provide better results in some cases.

The invention also relates, for use in spectrometers, to means for minimizing the effects of positional maladjustment which would, on the control wavelength, offset the exit device from the image of the entry device produced by that part of the apparatus (i.e. the optical system thereof) which is between the entry device and the exit device. Such an offset can be broken down into a shift in a direction parallel to the spectrum-spread direction, which is not really a disadvantage, and to a shift in the direction perpendicular to the spectrum-spread direction. The invention therefore provides entry and/or exit devices for which the effect of this second shift—i.e., the shift perpendicular to the spectrum-spread direction which in this case coincides with the basic direction—is reduced considerably.

The invention accordingly extends to an embodiment wherein the entry device and the exit device are each formed by the juxtaposition side-by-side, perpendicularly to the spectrum-spread direction, of a number of substantially identical elongated strips, each of which is a portion of an entry or exit element as hereinbefore defined.

The invention also relates to embodiments wherein means are provided to enable the apparatus to retain its qualities notwithstanding the juxtaposition of substantially identical strips.

In all its various embodiments, the apparatus according to the invention has by its nature a very high luminosity, the radiation flux entering the apparatus through all the "passage zones" of the entry device whose area can be several hundreds of times (in some cases up to almost a thousand times) greater than the area of the single entry slit of a slit spectrometer, nearly all of the input energy carried on the control wavelength being applied to the receiver; also, the apparatus according to the invention has a resolving power which can be as great as is permitted by the constituent parts of the apparatus other than the entry and exit elements according to the invention. In other words, the entry and exit elements according to the invention can be so constructed as not to impose any restriction on the resolving power of the optical components.

The entry and exit elements according to the invention can also be used with advantage in cases where a high resolving power is not necessary, in which event the main advantages are the high luminosity and the ease of operation of the apparatus fitted with the entry and exit elements according to the invention.

The apparatus according to the invention is of use in general for the conventional applications and studies of spectrometry in absorption or in emission. The apparatus is very useful in the case where the incident flux transmits relatively little energy, i.e., the amount of radiant energy received per unit of surface intercepting the incident beam is low. The apparatus is also very useful in cases where the incident flux may be carrying energy on various wavelengths and the energy quantities carried thereby differ very considerably from one another, some possibly being very small and others possibly being many times greater than the smallest values. The apparatus according to the invention provides accurate spectral analysis by enabling precise measurement of the energy, even if very low, transmitted on a particular wavelength, without fabrication of the result by an error possibly due to the presence of a considerably higher energy on a different wavelength.

In the following exemplary description reference will be made to the accompanying drawing wherein:

FIG. 1 is a general diagram of a spectrometer using a first embodiment of the entry and exit devices according to the invention;

FIG. 2 is a front view of an element used in the construction of the spectrometer shown in FIG. 1;

FIG. 3 is a diagram illustrating a method of tracing zone-bounding curves;

Figure 5:
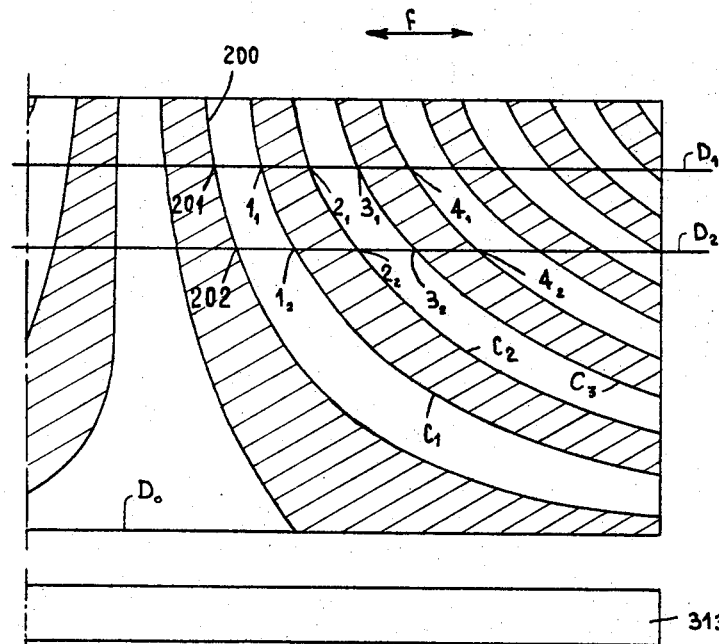
Figure 6:
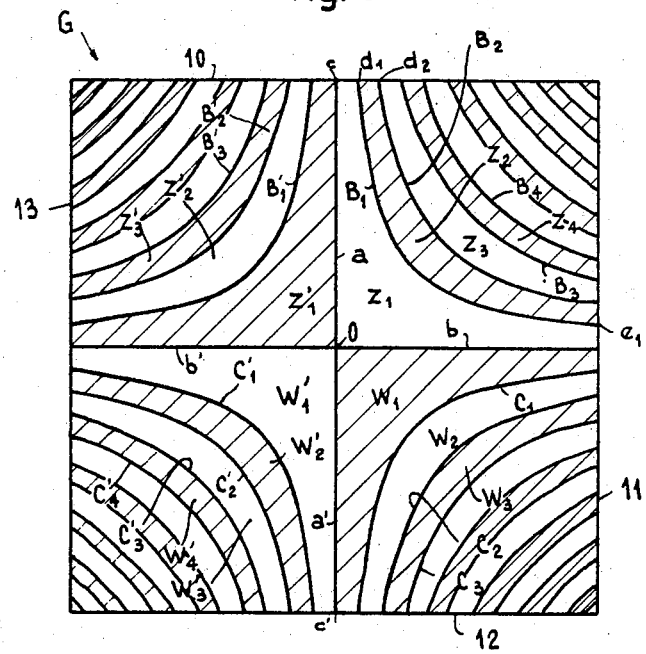
Figure 7:
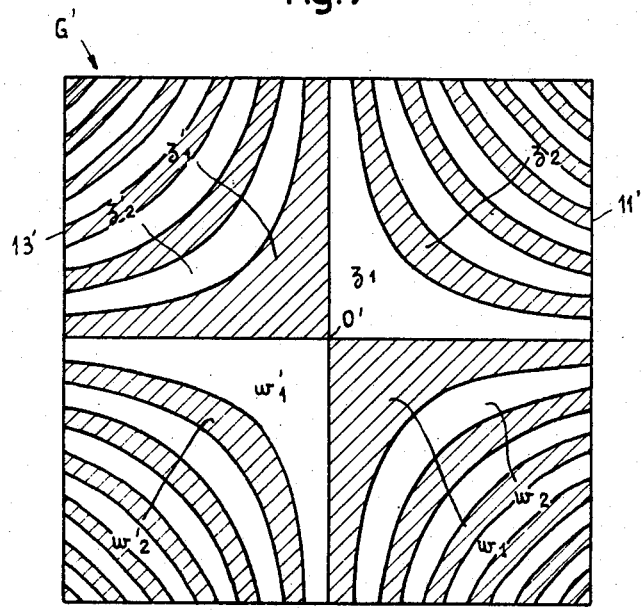
Figure 8:
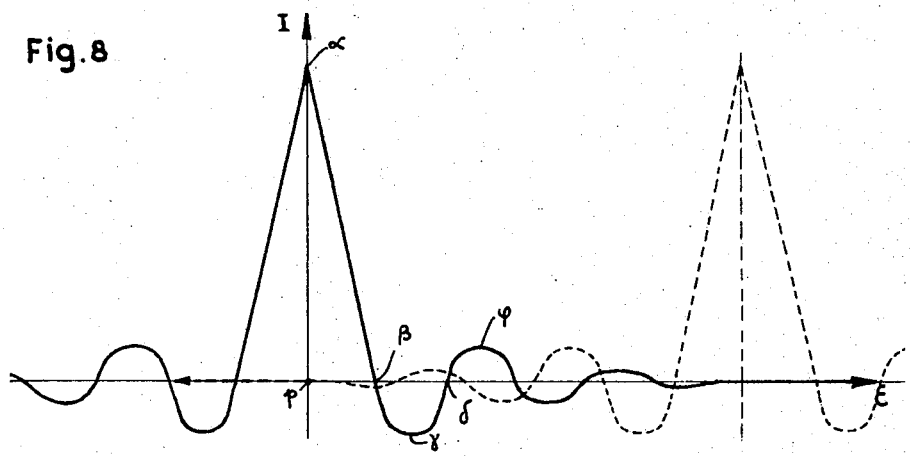
Figure 9:
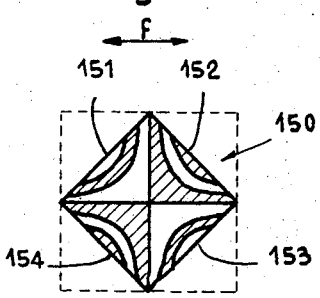
Figure 10:
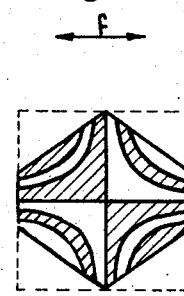
Figure 11:
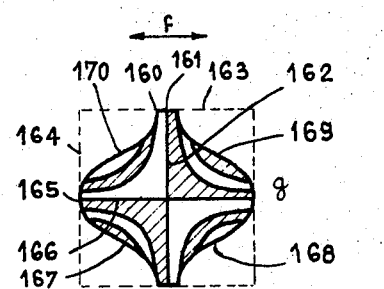
Figure 12:
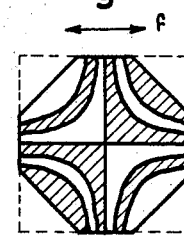
Figure 21:
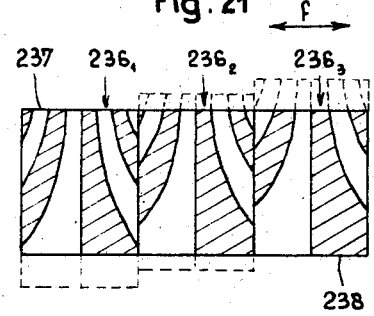
Figure 22:
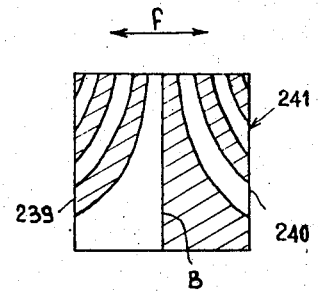
Figure 24:
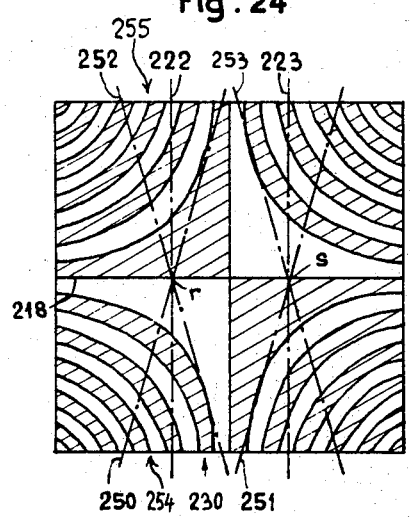
Figure 25:
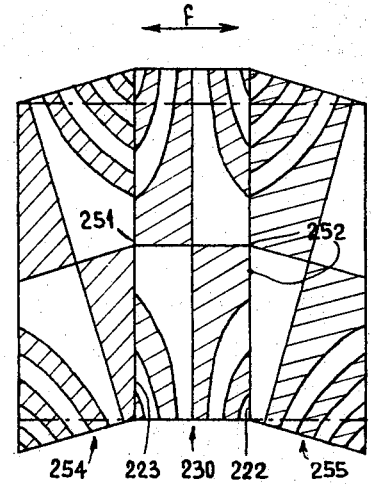
Figure 23:
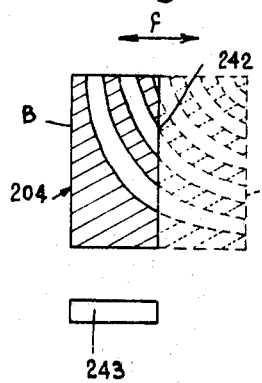
Figure 27:
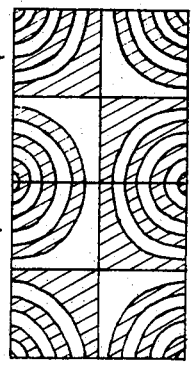
Figure 26:
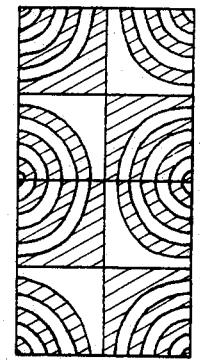
Figure 49:
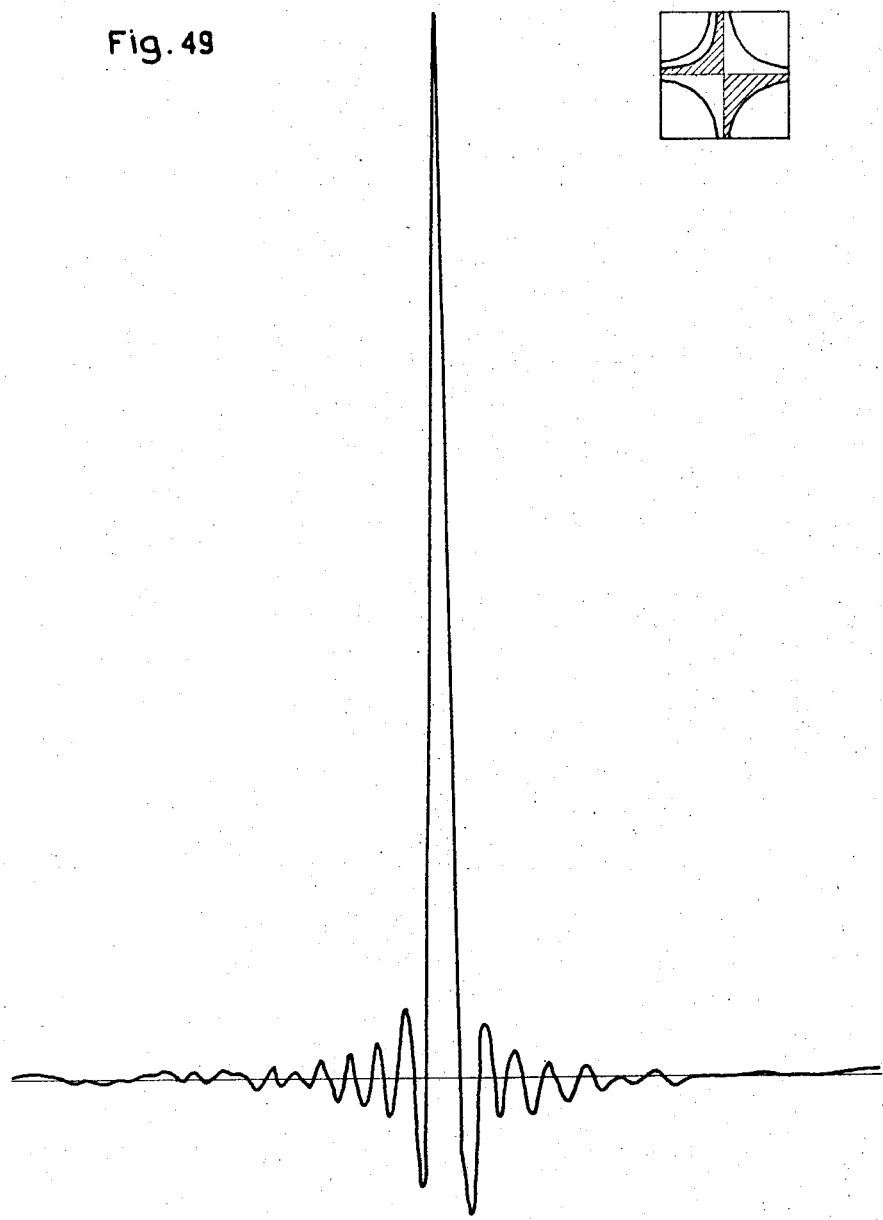
Figure 51:
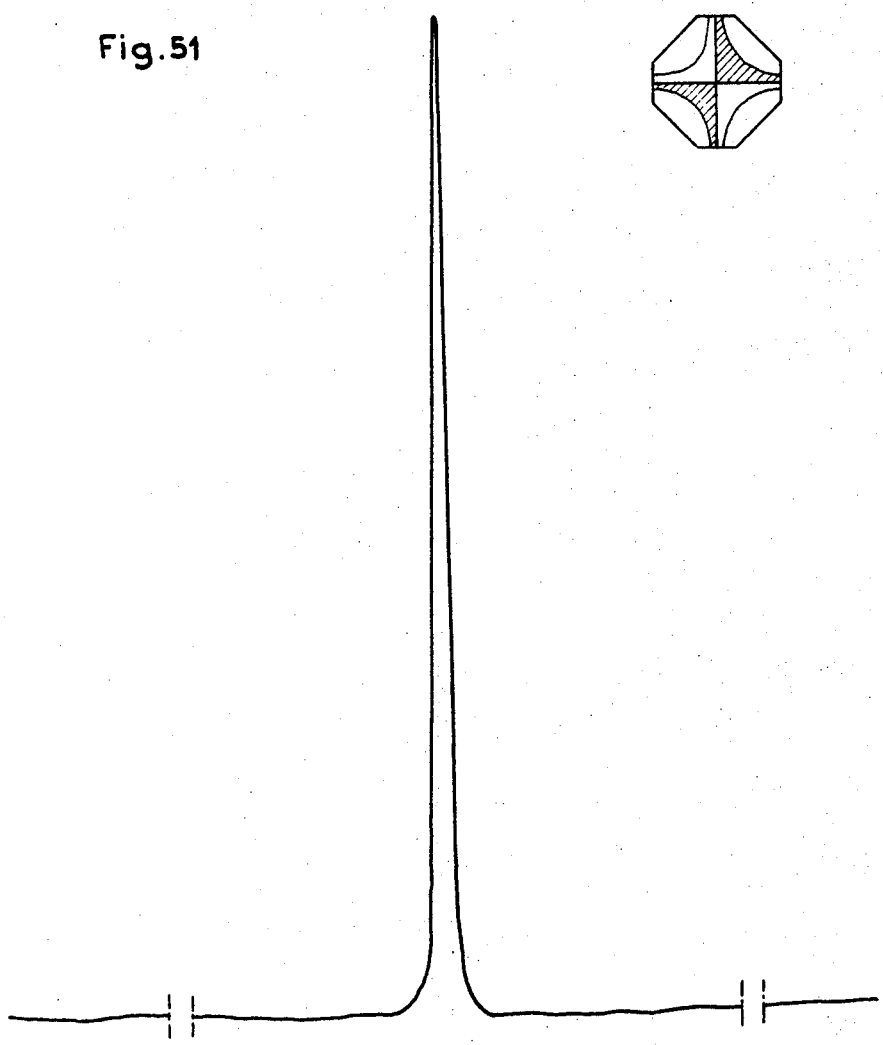
Figure 52:
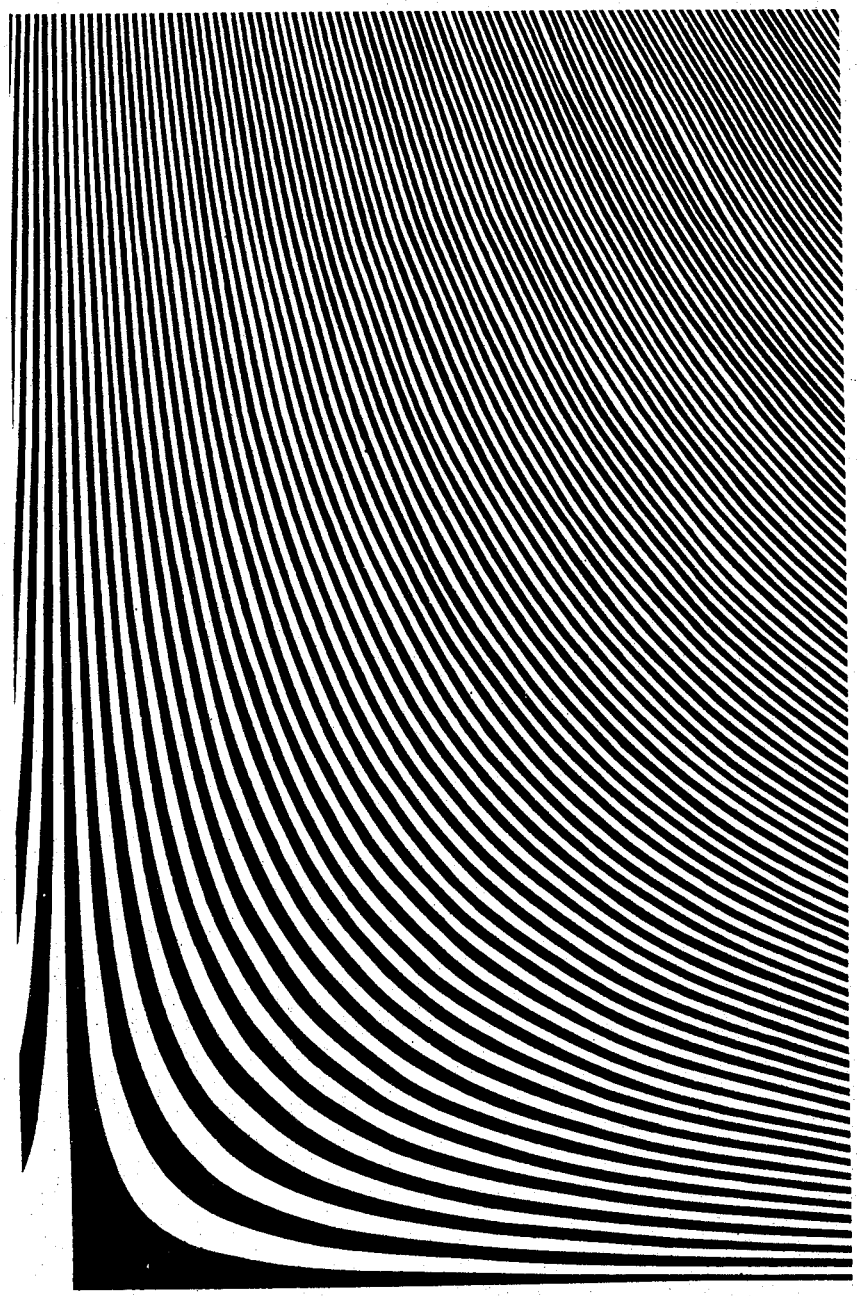

FIG. 5 diagrammatically illustrates an embodiment based on FIG. 3;

FIG. 6 is a view on enlarged scale of an entry element according to the invention for a specific embodiment;

FIG. 7 is a view of a corresponding exit element;

FIG. 8 is a diagram showing the result yielded by an apparatus according to the invention;

FIG. 9 illustrates an entry or exit element for a specific embodiment;

FIG. 10 is a view similar to FIG. 9 but of another embodiment;

FIG. 11 is a view similar to FIGS. 9 and 10 but of another embodiment;

FIG. 12 is a view similar to FIGS. 9 to 11 but for still another embodiment;

FIGS. 13, 14, 15 and 16 illustrate yet further embodiments of entry or exit elements;

FIG. 17 illustrates a modification;

FIG. 18 shows the treatment of an element as shown in FIGS. 6 and 7;

FIG. 19 illustrates a strip formed by cutting off the sides of the element;

FIG. 20 illustrates an entry or exit device formed by combining strips of the kind shown in FIG. 19;

FIG. 21 illustrates an entry or exit device built up in a similar way but on the basis of the element shown in FIG. 11;

FIGS. 22 and 23 illustrate two other embodiments;

FIG. 24 illustrates another strip construction based on an element of the kind shown in FIGS. 6 and 7;

FIG. 25 illustrates a device constructed from strips of this kind;

FIG. 26 illustrates a device constructed by juxtaposing two entry or exit elements of the kind shown in FIGS. 6 and 7;

FIG. 27 illustrates an exit device of use with the entry device illustrated in FIG. 26;

FIG. 28 illustrates a device of the kind shown in FIG. 26 but improved;

FIG. 29 illustrates a device of the kind shown in FIG. 20 but improved;

FIG. 30 illustrates a device of the kind shown in FIG. 20 but incorporating a modification of the improvement shown in FIG. 29;

FIG. 31 is a view similar to FIG. 1 but for still another embodiment;

FIG. 32 is a diagrammatic view showing a part of the apparatus illustrated in FIG. 31 in modified form;

FIG. 33 is a view similar to FIGS. 1 and 31 but for yet another embodiment;

FIG. 34 is a front view of the entry elements of the embodiment illustrated in FIG. 31;

FIG. 35 is a view of an exit element;

FIG. 36 is a diagram of an apparatus according to the invention for another embodiment;

FIG. 37 shows the path followed by the light through the apparatus illustrated in FIG. 36 in one condition;

FIG. 38 is a front view of an element used in the construction of an apparatus shown in FIG. 37;

FIG. 39 is a diagrammatic front elevation of an entry element used in the construction of the apparatus illustrated in FIG. 36;

FIG. 40 is a view similar to FIG. 39 but of the other entry element;

FIG. 41 is a diagrammatic view of a part of an apparatus as shown in FIG. 36 in modified form;

FIG. 42 is a view similar to FIGS. 1, 31 and 36 but for yet another embodiment of the apparatus;

FIG. 43 is a front elevation, drawn to an enlarged scale, of an entry element used in the construction of the apparatus illustrated in FIG. 42, with its constituent parts separated from one another to make the view clearer;

FIG. 44 is similar to FIG. 43 but shows an exit element;

FIG. 45 is a diagrammatic view of another embodiment of the apparatus;

FIG. 46 is a diagrammatic view of an arrangement of use at the exit of an apparatus according to the invention;

FIG. 47 is a view similar to FIG. 46 but showing a modification;

FIG. 48 is a front view of an element used in the construction of the arrangement illustrated in FIG. 47;

FIG. 49 is a diagram recorded on a recorder following an apparatus according to the invention;

FIG. 50 is a diagram similar to FIG. 49 but for entry and exit elements of a different embodiment;

FIG. 51 is a view similar to FIGS. 49 and 50 but for an apparatus using entry and exit elements representing still another embodiment; and FIG. 52 illustrates a pattern from which entry and exit elements according to the invention can be formed.

In FIG. 1 there is illustrated, by way of example, a diagram showing the general arrangement of a spectrometry apparatus for an embodiment using entry and exit devices according to the invention which are also described solely by way of example. An incident beam 20, which, for the sake of convenience in the drawing, is shown as coming from a source S, falls on a disc 21 which is rotatable around an axis 22 and which is cut so as to have a number of lobes 23, visible in FIG. 2, separated by gaps 24. The lobes 23 are reflecting and, as the disc 21 rotates, the incident beam 20 either passes through a gap 24, to give rise to a beam 25, or is reflected by a lobe or tooth 23, to give rise to a beam 26. The beams 25, 26 are each intercepted by a respective concave mirror 27, 28 and reflected thereby, as beams 29 and 30, respectively, to an entry element or gate 31 according to the invention identified hereinafter by the reference G. The entry element 31, the construction of which will be described in greater detail hereinafter, comprises reflecting surface areas 32 on the side facing the mirror 27, and transparent areas 33.

The reflecting areas 32 break up the beam 29 into a plurality of light pencils 34 which are reflected by a concave mirror 35 onto a dispersing system P formed by a lattice which produces dispersed pencils 36; the latter after further reflection on the mirror 35, fall on an exit element or gate 37. The element 37, identified hereinafter by the reference G', comprises transparent portions 38 and non-transparent portions 39 and its construction will be described in greater detail hereinafter. The pencils 40, having traveled through the exit element 38, are reflected by concave mirror 41 onto receiver R.

Pencil 30 passes through the transparent parts 33 of the entry element 31 which therefore provides pencils 42; the latter, after reflection on the mirror 35, are incident on the dispersing system P which produces dispersed pencils 43; these, after further reflection on mirror 35, are incident on exit element 37. The pencils 44 passing therethrough are reflected on mirror 41 and are incident on receiver R.

A description will now be given of one embodiment of an entry device, and of an exit device which is superimposed so as to coincide with the image of the entry device as created by the apparatus. The entry device comprises a flat support comprising zones associated with two pluralities differing from one another in the mode of transmission which they impart to the incident flux; these are transparent zones, opaque non-reflecting zones and reflecting zones. Advantageously, zone-bounding curves can be generated as follows: starting from a curve 300 (FIG. 3) referred to as the directrix, the ends of which have the references 301, 302 and which extends generally transversely to a selected basic direction 303, not parallel to a line that is tangent to the curve 300 at any point between the ends 301 and 302, a straight reference line 304 is drawn parallel to the the basic direction 303; from different points of the curve 300, for instance, from point 305, a straight line 306 is drawn parallel to the basic direction 303; and on the line 306 a distance $d$ is marked off, on one or both sides of the curve 300, which decreases with increasing distance between the lines 306 and 304 this relationship advantageously being non-linear. For instance, if a variation based on inverse proportionality or a similar relationship is used, the length to be marked off becomes very large for a straight line near the reference line. The distance $d$ can be made as small as required for a parallel disposed at a given distance from the reference line by an appropriate choice of the law meeting the condition just set forth; conversely, for a given law there is a parallel for which the length $d$, or length of the sections, is as small as desired.

This leads, for instance, to points 1, 2, 3 and so on plotted with uniform separation along the line 306 to the right of the curve 300 and, if desired, to the points 1', 2', 3' and so on plotted with like spacing on the left of the curve 300. The points $1a$, $1b$, $1c$ and so on are obtained on the line 307 which is nearer the line 304 than is the line 306, while the points $1a'$, $2a'$, $3a'$ and so on are obtained on that part of the line 307 which is to the left of the curve 300 for the person looking at FIG. 3, the length of the sections on the line 307 being greater than the length of the corresponding sections on the line 306.

The curves separating adjacent zones are produced by interconnecting analogously designated points 1, $1a$ etc. on the various lines 306, 307 and so on. This leads to curves $A_1$, $A_2$, $A_3$ and so on to the right of the curve 300 and to the curves $A_1'$, $A_2'$, $A_3'$ and so on to the left of the curve 300, these curves diverging as they approach the reference line 304. The adjacent zones have different transmission effects on a radiation flux incident upon them and this state of affairs is shown in FIG. 3 by hatching the part bounded, for instance, by the curve 300 and the curve $A_1$, by not marking the surface bounded by the curve $A_1$ and the curve $A_2$, by hatching the surface bounded by the curve $A_2$ and curve $A_3$ and so on, the same procedure being used on the other side of the curve 300.

An entry or exit device is constructed from such a flat support, and its contour is such as to encompass a portion where consecutive curves are very close together in the direction 303, and a portion where two consecutive curves are very far apart from one another in the direction 303, in general at least one hundred times farther apart from one another than in the portion where the curves are very close together.

The device is so designed that in the portion where the curves are closest together—i.e., at a minimum spacing taken along the basic direction 303—two consecutive curves are separated from one another by a distance inversely proportional to the resolving power of the apparatus. The resolving power of an apparatus comprising such devices then becomes at least as great as in an apparatus with single-slit entry and exit gates whose slit width is equal to the minimum spacing just mentioned. The contour of the device can be square or rectangular, the sides being parallel and perpendicular to the basic direction 303, or have some other kind of shape, as will be seen hereinafter.

Figure 4:
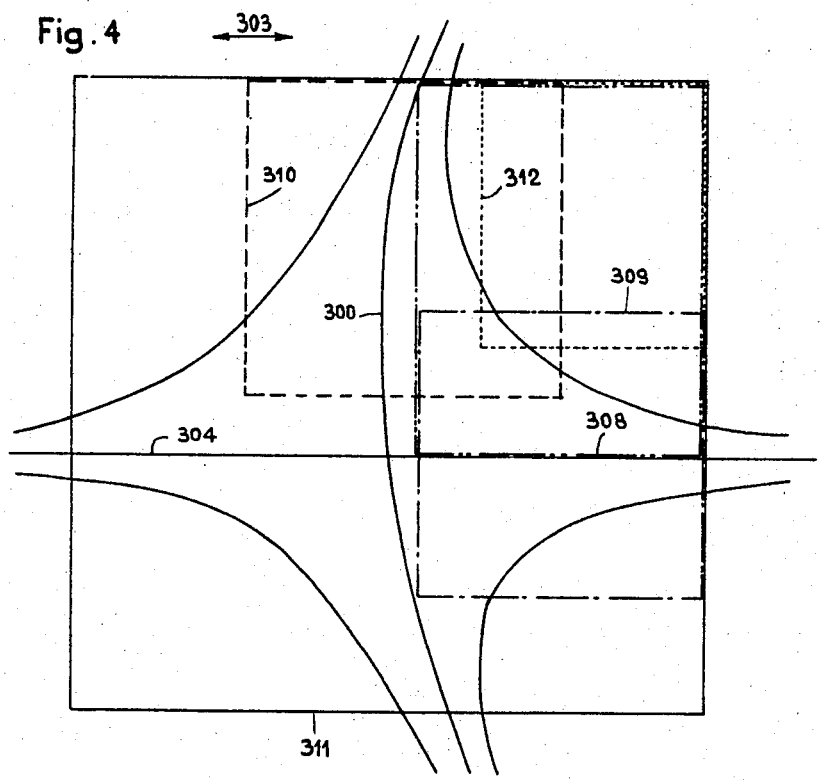
FIG. 4 illustrates a number of contours of devices comprising zones bounded by the curves shown in FIG. 3.

FIG. 4 illustrates by way of example a number of such square or rectangular contours having respective references 308–312, the different contours being denoted by different kinds of outline; only a few curves are shown. In all cases the total of the areas of the zones of one plurality and the total of the areas of the zones of the other plurality—i.e., the zones bounded by the resulting curves—are equal; if any slight inequality does exist, it can readily be compensated for. Accordingly, a complementary correcting surface is provided in the direction 303 which has an area equal to the difference between the totals and which is of the same nature as the zones having the smaller total area.

As an alternative form of construction, a start can be made from the reference line 304 by marking thereon, on either side of the directrix curve 300, points equidistant from one another, for instance, by the minimum spacing required between the curves, then by marking out from the various other points of the directrix curve, on each of several straight lines parallel to the reference line, points equidistant from one another, the separation of those points along any line varying in accordance with a non-linear law in dependence upon the distance of the respective line from the reference line and being such that, on the straight line passing through the other end of the directrix curve, the separation of the points is a multiple (e.g. of a magnitude of several hundreds) of that plotted along the reference line.

Again, instead of starting from a straight line distant from the reference line 304 in the manner illustrated in FIG. 3, a start could be made from the actual reference line, in which event distances which, relatively speaking, are very large are plotted on the reference line on either side of the directrix curve 300, whereafter, from the various other points of the directrix curve, distances are plotted on each of the straight lines parallel to the reference line, these distances varying in dependence upon the distance from the reference line so as to decrease non-linearly and be at the required minimum spacing at the other end of the device.

As illustrated in FIG. 5, the directrix curve used is a curve 200 having a hyperbolic configuration, while the basic direction is a direction asymptotic to the curve 200 and the reference line $D_0$ is the asymptote to the curve 200 and is parallel to the basic direction. To construct the curves which will subsequently form the boundaries between the zones of the first plurality and the zones of the second plurality of an entry or exit device according to the invention, starting from a point 201 on the curve 200 equal sections are plotted along a straight line $D_1$ parallel to the basic direction, the latter being indicated by an arrow $f$, the ends of these sections having the references $1_1$, $2_1$, $3_1$, $4_1$ and so on The same procedure is adopted starting from various other points on the curve 200. For instance, points $1_2$, $2_2$, $3_2$, $4_2$ and so on are plotted from point 202 along a straight line $D_2$ disposed on the same side of $D_0$ as is $D_1$. The length of the sections cut off on the various straight lines $D_1$, $D_2$ and so on varies, in a non-linear manner and decreases with increasing distances between each of the straight lines $D_1$, $D_2$ etc. and the reference line $D_0$. Points of like indices are then joined together by respective curves $C_1$, $C_2$ and so on. The two sets of zones are bounded by such curves and by edges parallel to the direction of the straight lines and to a transverse direction. Two adjacent zones have different transmission effects on incident rays, a state of affairs indicated in FIG. 5 by zones that are alternately hatched and unhatched. If required, a compensating or correcting surface 313 is provided to make the total of the areas of the zones of the first set (unhatched) equal to the total of the areas of the zones of the second set (hatched).

Reference will now be made to FIGS. 6 and 7 which illustrate another embodiment of an entry or exit element G, G'. Two perpendicular lines $a$, $a'$ and $b$, $b'$ extend from a point O chosen as center. One such line, for instance, the line $b$, $b'$, is taken as basic direction. From a point $c$ chosen as the upper end of the grid of the element on the straight line $a$, a distance is marked off along a line 10 parallel to the line $b–b'$, this distance being proportionally smaller as the required resolving power is higher. If desired, the straight line $a$, $a'$ can be inclined relatively to the straight line $b$, $b'$. This takes us to the point $d_1$. From that point there is traced one branch of an equilateral hyperbola $B_1$ whose asymptotes are the lines $a$ and $b$. From point $d_2$ on line 10, at a distance from $d_1$ equal to the distance between $d_1$ and $c$, a branch $B_2$ of an equilateral hyperbola is traced, the asymptotes of which are also $a$, $b$, and so on, the hyperbola branches $B_3$, $B_4$ being produced similarly. The zone $Z_1$ between the branch $B_1$ and the asymptotes $a$ and $b$ is left transparent; the zone $Z_2$ between the hyperbola branches $B_1$ and $B_2$ is made reflecting; the zone $Z_3$ between the hyperbola branches $B_2$ and $B_3$ is left transparent; the zone $Z_4$ between the hyperbola branches $B_3$ and $B_4$ is made reflecting, and so on, as denoted by the hatched and unhatched zones in the drawing. A similar procedure is used for that part of the line 10 which is on the other side of the point $c$, yielding hyperbola branches $B'_1$, $B'_2$, $B'_3$ and so on which are symmetrical images relatively to the line $a$ of the arms $B_1$, $B_2$, $B_3$ and so on and which have as asymptotes the lines $a$ and $b'$.

The zone $Z'_1$ between branch $B'_1$ and the asymptotes $a$ and $b$ is made reflecting, the zone $Z'_2$ between the hyperbola branches $B'_1$ and $B'_2$ is left transparent, the zone $Z'_3$ between the hyperbola arms $B'_2$ and $B'_3$ is made reflecting, and so on, as is again shown by the hatched and unhatched areas in the drawing. A similar procedure is adopted starting from lower end point $c'$ on line $a'$ symmetrically opposite point $c$ relatively to the point O on the line 12 parallel to the line 10, whereby there are produced hyperbola branches $c_1$, $c_2$, $c_3$ symmetrical to the branches $B'_1$, $B'_2$, $B'_3$ relatively to the point O, and hyperbola branches $C'_1$, $C'_2$, $C'_3$ and so on symmetrical to the arms $B_1$, $B_2$, $B_3$ and so on relatively to the point O; these hyperbola branches determine, by their intersection with the line 12, intervals which are equal to one another and to the intervals determined on the line 10 by the intersection thereof with the hyperbola branches $B_1$, $B_2$, $B_3$ etc. and $B'_1$, $B'_2$, $B'_3$ etc. The zone $W_1$ between the hyperbola branch $C_1$ and the asymptotes $a'$, $b$ is reflecting, and so on, while the zone $W'_1$ between the hyperbola branch $C'_1$ and its asymptotes $a'$, $b'$ is left transparent, and so on. In this embodiment the hyperbola $B_1$, $C'_1$ can be considered as the directrix curve, an asymptotic direction can be considered as the basic direction, and the parallel asymptote can be considered as the reference line, the branches of the equilateral hyperbolae cutting off equal sections on any straight line parallel to an asymptote.

The plane of the entry element G is disposed transversely to the incident flux, advantageously at approximately a right angle relatively to the optical axis of the projection system represented in FIG. 1 by the mirrors 27, 28, 35, 41. The entry device G is so placed that its geometric center is on or near the optical axis and can be positioned so that its basic direction is oriented in any way relatively to the spectrum-spread direction.

In the embodiment illustrated in FIG. 6, the entry member G can, for instance, be so placed that one of the axes of the hyperbola branches forms an angle of up to 45° with the spectrum-spread direction, and in the limiting case (angle of 45°) the outer contour of the element is, for instance, a square if the axes are perpendicular, the line $c-c'$ being a diagonal of the square (see FIG. 9).

However, better results are achieved if the entry element is so placed that the basic direction extends parallel to the spectrum-spread direction. In the case shown in FIG. 6, an asymptote is parallel to the spectrum-spread direction, and the outer contour of the entry member is, for instance, a square, if the asymptotes are perpendicular, the line $c, c'$ being a median of that square.

The exit element G' is superimposed on the monochromatic image projected through the apparatus of the entry member G so that the curves bounding its zones of different transmission characteristics are superimposed upon the projected monochromatic images of the boundary curves of the entry element G; the transmission characteristics of the exit-member zones may or may not be similar to the transmission characteristics of the entry-element zones on whose images they are superimposed, the zones of the two sets of zones of the exit member having again different transmissivity.

In the embodiment illustrated in FIG. 7, the exit member G' is constructed similarly to the entry member G shown in FIG. 6, but the reflecting areas in the entry member can be replaced by opaque and non-reflecting areas in the exit member. Thus, the zone $z_1$ is transparent, the zone $z_2$ is opaque and so on; the zone $w_1$ is opaque, the zone $w_2$ is transparent and so on; the zone $z'_1$ is opaque, the zone $z'_2$ is transparent and so on; the zone $w'_1$ is transparent, the zone $w'_2$ is opaque and so on. As one possible variant, the entry element remains as hereinbefore described but the exit member is so constructed that the transparent zones of FIG. 6 are made opaque and the opaque zones are made transparent. Of course, the constructions hereinbefore described are not mandatory and many other possible constructions will become apparent to the person skilled in the art of producing a family of hyperbolae.

To produce such entry elements in practice, conventional photographic reduction processes can be used which start from a large-scale drawing. Intervals which are as narrow as required—of the order of a hundredth of a millimeter—can then be provided between two consecutive hyperbolae in the zones where the hyperbolae are closest together.

A convenient procedure for producing the exit member is to photograph the entry member through the apparatus in monochromatic light. Correction is therefore provided automatically for all the aberrations introduced by the apparatus, and the exit member is bound to be superimposed upon the entry-element image projected by the apparatus. Of course, the photography is so arranged that the zones have the required transmission characteristics of opacity, transparency or reflection.

In both FIG. 6 and FIG. 7 there exists, within each quadrant, a direction along which the spacing of the hyperbolic curves decreases progressively from the center O outwardly, this direction corresponding to the bisector of the angle between the asymptotes $a, b$, i.e. to the common real axis of the hyperbolae extending at 45° to each asymptote. Thus, the pattern includes a first group of curves closest to center O whose spacing along that axis is relatively large, a second group remote from the center whose spacing is relatively small (the ratio between maximum and minimum separation being preferably on the order of at least 100:1, as noted above), and an intervening third group with progressively varying curve separations intermediate the above extremes.

In the spectrometer illustrated by way of example in FIG. 1, an entry element according to the invention, such as that shown in FIG. 6, is placed with its center O on the optical axis of the spectrometer and with its axis $b, b'$ extending parallel to the basic direction which, advantageously, extends in the spectrum-spread direction (in the case of equilateral hyperbolae and because of the double symmetry this could also be the axis $a, a'$); the corresponding exit element (FIG. 7), constructed to coincide with the monochromatic image of the entry element projected by the apparatus, is also so placed that its center O' lies on the optical axis of the spectrometer and its axis $b, b'$ extends in the spectrum-spread direction, or the spectrometer is adjusted to bring about this relationship.

In this example the entry element has its zones alternately transparent and reflecting, while the corresponding exit element has its zones alternately transparent and opaque as well as non-reflecting. Corresponding to a particular position of the dispersing system P is a wavelength—the control wavelength—at which the image of the entry element G (or 31) is exactly superimposed upon the exit element G' (or 37), the image of the transparent zone $Z_1$ merging with the transparent zone $z_1$ of the exit element, and the image of the reflecting zone $Z_2$ merging with the opaque zone $z_2$ of the exit element, and so on. Similarly, the image of the reflecting zone $Z'_1$ of the entry member merges with the opaque zone $z'_1$ of the exit element and so on, the image of the reflecting zone $W_1$ of the entry element merges with the opaque zone $w_1$ of the exit element and so on, the image of the transparent zone $W'_1$ of the entry element merges with the transparent zone $w'_1$ of the exit element and so on.

FIG. 8 shows in solid lines, and with some elongation of the abscissae to make the illustration clearer, the pattern of a curve showing the difference between the quantities of energy carried by the light pencils 40 and 44 (FIG. 1). When the radiation source is a source having a single wavelength or, in an equivalent manner emits a flux on an infinitely narrow wavelength and when the position of the dispersing system P is varied, the maximum energy, represented by the ordinate at the point α, is transmitted when the dispersing system is in a position at which the image of the entry member G or 31 (FIG. 1) created by the spectrometer is superimposed upon the exit element; the image of the zone $Z_1$ (FIG. 6) is superimposed upon the zone $z_1$ (FIG. 7), the image of the zone $Z_2$ of the entry element is superimposed upon the zone $z_2$ of the exit element, and so on. When the dispersing system is in this position, the description of the operation given with reference to FIGS. 1 and 2 can be understood as follows:

All the radiation which is emitted by the source S and which is incident (beam 30) on the transparent zones 33 of the entry element, i.e., half the total radiation received by the entry member (since the totals of the areas of the zones of the two pluralities are equal to one another), passes through the transparent zones 38 of the exit element and is therefore applied as the beam 40 to the receiver R, whereas the radiation which is incident on the reflecting surfaces 32 of the entry element is transmitted entirely to the opaque zones 39 of the exit element which coincide with the images of the reflecting zones of the entry element, so that the radiation incident on the surfaces 32 of the entry element does not pass through the exit element and does not reach the receiver. When the dispersing system—in this specific case, the diffraction grating P—is moved out of the position hereinbefore defined, which can be called the control position, the image of the entry element ceases to be exactly superimposed upon the exit element. The image of the zone $Z_1$ covers only part of the exit-member zone $z_1$ and also part of an opaque zone, for instance, of the zone $z_2$, adjacent the zone $z_1$; similarly, parts of the zone $z_1$ are covered by an image which is not the image of the zone $Z_1$ but that of a reflecting zone adjacent the zone $Z_1$, for instance, the zone $Z'_1$. This offset of the entry-element-zone images relatively to the exit-element zones—with which such images coincide when the dispersing system is in the control position for the control wavelength, as hereinbefore described—becomes greater in proportion as the dispersing system is moved further away from the control position; the image of the zone $Z_1$ may even cover the parts $z_3$, $z_4$ and possibly even cease to be projected at all on the exit element but be formed outside the same beyond the side 11' (FIG. 7). The offset may even become so great that the image of the side 13 of gate G coincides with the side 11' of gate G', in which case the image of the entry element lies just outside the exit element and beyond the side 11'. Similar offsets in the opposite direction can be noted if the dispersing system is moved in the opposite direction away from the control position.

Whereas in the control position the signal delivered by the receiver, representing the difference between the energies carried on the two sets of pencils 40 and 44, corresponds to all the enregy carried alone on the pencils 40, the energy carried on the pencils 44 therefore being zero, the difference between the energies carried upon the pencils 40 and 44 (FIG. 1) starts to decrease upon a shift from the control position to different positions, the decrease being very rapid and following a linear pattern as denoted by the straight line $\alpha$ in FIG. 8. At the point $\beta$ the difference is zero. Beyond $\beta$ the difference becomes negative, i.e., the radiation carried on the pencils 44 is greater than the radiation carried on the pencils 40, up to a peak at point $\gamma$. With continuing rotation of the grating P to continue the shift, the absolute value of the difference gradually decreases and becomes zero again at point $\delta$, the line joining the points $\beta$, $\gamma$, $\delta$ having a sinusoidal pattern. The difference then increases at the same slope to reach a positive peak at the point $\varphi$, whereafter the difference decreases and rapidly drops to zero after a sequence of variations denoted by the sinusoidally decaying curve of FIG. 8. The abscissa of the point $\delta$ is twice the abscissa of the point $\beta$ and the abscissae of the points of the diagram of zero ordinate are evenly distributed, all the points of the diagram tending rapidly to merge with the abscissa axis as shown. The behavior of the spectrometer is absolutely symmetrical if the dispersing system is moved in the other direction away from the control position.

For elements as shown in FIGS. 6 and 7, the first secondary maximum or lobe is negative and about 17% of the maximum corresponding to the control wavelength; the next maximum is positive and about 12% of the maximum corresponding to the control wavelength, the next negative maximum is about 7% of the ordinate of the point $p$, the next positive maximum is about 3% of that ordinate, and the value of these consecutive maxima then drops rapidly almost to zero and remains zero for all other orientations of the dispersing system will still further away from the control wavelength.

The resolving power can be considered as inversely proportional to the distance between the point $p$ in FIG. 8, i.e., the abscissa at which the signal is a maximum, and the point $\beta$ where the signal first passes through zero. This resolving power is equal to that of a spectrometer having a single entry slit of a width equal to the smallest transmission interval counted parallel to the spectrum-spread direction, i.e., to the distance $c-d_1$ in FIG. 6.

The curve which is shown in FIG. 8, and which can be directly produced by recording means operated by the receiver, therefore represents the difference values for the energies carried on each of the two issuing beams for each position of the dispersing system whose off-normal positions can be distinguished from one another by the angle through which the dispersing system has rotated from an origin or reference position to reach any such off-normal position. The values of these angles form the abscissa, graduated in angular units, of each of the ordinates of the curve.

If a monochromatic beam of a different wavelength is treated as hereinbefore described, the entry-element image on such wavelength coincides exactly with the exit device, and the transmission of energy borne by this new monochromatic flux reaches its maximum value, at a different angular position or different abscissa of the dispersing system; and if the last-mentioned energy is equal to the energy carried by the previous flux at the original wavelength, the curve recording the difference between the energies carried by the first and second beams issuing from the spectrometer will be the same for the second flux as for the first flux but will have been shifted along the abscissa axis by an amount equal to the difference between the abscissae in angular units corresponding to those two positions of the dispersing system at which the entry-device image exactly coincides with the exit device on each of the two wavelengths. A second such curve is shown in dot-dash lines in FIG. 8.

If the energy borne by the second monochromatic flux is greater or less than the energy borne by the first such flux, the dot-dash curve of FIG. 8, representing the difference between the energies of the two issuing beams for the second flux, stays in the same position relatively to the solid-line first curve, but the ordinates of the dot-dash curve are multiplied by a factor greater or less than unity as determined by the ratio of the energies respectively carried by the two fluxes.

It will be readily apparent that if the two fluxes are combined into a single beam entering the spectrometer, then for each position of the dispersing system—i.e., on each abscissa in angular units on the diagram—the difference between the energies carried by each of the two beams issuing from the apparatus is denoted by the algebraic sum of the corresponding ordinates of each of the two curves plotted for the monochromatic fluxes. Clearly, therefore, to obviate interaction between the curves—i.e., to ensure that the value of each principal maximum representing the energy carried on each of the two wavelengths is not falsified—the two wavelengths must differ from one another to such an extent that the locations of the main maxima of the two curves are so far apart that each absolute maximum fails into a region of the other curve where the secondary maxima thereof have dropped substantially to zero.

Actually, the minimum separation required for this condition is very slight, being equal to a very small number of times the elementary length $p\alpha$ which is in any case very small since it is in inverse proportion to the separating power of the spectrometer and that power is very great; a very slight difference between two wavelengths is thus sufficient to ensure that the energy carried on one wavelength does not affect the measurement of the energy carried on the other.

The minimum interval between two wavelengths compatible with independent measurements of the energy transmitted on each of them can be even further reduced by another step which will be described hereinafter and which concerns not the arrangement of the entry and exit elements—i.e., not the form of the curves separating alternate zones of different transmissivity on these elements—but the outer contour of the elements or the sharpness of the boundaries between the alternate zones thereof.

This aspect of my invention therefore relates to entry and exit elements wherein the secondary maxima denoted by the ordinates of the points $\gamma$, $\varphi$ and so on of FIG. 8 are reduced considerably below the secondary maxima provided by a spectrometer having an entry element and an exit element of square contour as just described.

According to FIG. 9, which again shows the spectrum spread direction by an arrow 1, an entry or exit element 150 is diagrammatically illustrated which has been produced from an entry or exit element of the kind shown in FIGS. 6 and 7 and which has had the corners removed along the diagonals of the four squares defined and bounded by the asymptotes, thus providing a diamond-shaped entry or exit element which is bounded by the sides 151–154 and will be in the shape of a square if the starting element has a square contour.

In the entry or exit element whose contour is shown in FIG. 10, portions where the curves are very close together have been retained.

In the embodiment illustrated in FIG. 11, the contour of an entry or exit element is defined by a curve which has a port 170 starting from a point 160 very near the intersection 161 of the asymptote 162 with the side 163 and which, being of a shape comparable to double Gaussian bell curve, is tangential to the side 164 at the intersection 165 thereof with the other asymptote 166, the other parts 167, 168, 169 of the contour being symmetrical to the aforementioned part 170 with reference to either one or the other asymptote or to points of intersection thereof.

In the embodiment illustrated in FIG. 12, the entry and exit elements, which are derived from those illustrated in FIGS. 6 and 7, are produced from these elements by having the corners cut off to provide an octagonal contour.

With the embodiments which have just been described and which have a pattern similar to that shown in FIGS. 6 and 7 but a different contour, the amplitudes of the secondary maxima are reduced and in any case become negligible at a shorter distance from the abscissa of the main maximum. These patterns, as compared with those of FIGS. 6 and 7, have been clipped along oblique or curved lines in those regions (i.e. at the corners of a square) where the array of zone-bounding curves has its greatest density. To obtain the same resolving power as with an element whose corners have not been cut off, the network of hyperbolae must be denser.

FIG. 49 illustrates a recorded graph provided by a spectrometer according to the invention wherein the entry and exit gratings are of the kind shown in FIGS. 6 and 7, as symbolized by the diagrammatic illustration of such an element or grating in the top right-hand part of FIG. 49. The grating is a square with a side of 28 mm. Each grating contains 400 hyperbola branches. At the intersection with the sides of the square, the adjacent hyperbolae are separated by a spacing of 0.045 mm. from one another.

The graph of FIG. 49 shows a first secondary maximum of about 13% of the main maximum. The second secondary maximum is about 6% of the main maximum. The secondary maxima decrease continuously and the curve very soon merges and stays merged with the abscissa axis.

FIG. 50 illustrates a graph recorded with such a spectrometer using gratings of the kind shown in FIG. 10, i.e., patterns produced (as described with reference to FIG. 13) by cutting the corners off the element shown in FIGS. 6 and 7 but leaving the original hyperbolic lines in the zones where they are closest together (see inset). The length of the remaining sections of the vertical boundaries of this pattern is one-sixth of the length of the side of the original square, i.e., about 4.5 mm. Of course the main maximum is less than the maximum of FIG. 49. The first secondary maximum is about 2.5% of the main maximum and the subsequent secondary maxima are even less, the curve merging with the abscissa axis even sooner than in FIG. 49.

With regard to resolving power, the spectrometer providing the graph shown in FIG. 49 gives the same results as a single-slit spectrometer with a slit width of 0.045 mm., yet it has a luminosity 315 times greater.

The spectrometer which provided the graph shown in FIG. 50 has the same resolving power as a single-slit spectrometer with a slit width of 0.07 mm., its luminosity being 80% of the luminosity of the spectrometer having entry and exit elements of the kind illustrated in FIGS. 6 and 7.

The graph shown in FIG. 51 was prepared with the aid of a spectrometer having devices of the kind shown in FIG. 12 (see inset), except that the exit element was an imperfect and slightly blurred photograph of the entry element. There is almost no secondary maximum in the graph. The recorded curve, after a very rapid drop from the main maximum, soon merges with the abscissa axis. The apparatus is therefore almost perfect so far as the required result is concerned. It is thought that this is because the blur caused by the deliberate defocusing used in photographing the entry element to provide the exit element is more noticeable for the narrow zones than for the wide zones and reduces the contribution of the narrow zones to the resulting signal. This effect adds to the effect of reducing the number of narrow zones by truncating the elements.

The invention also proposes to apply this latter step to embodiments other than those shown in FIG. 12, in fact to all the other embodiments including that shown in FIGS. 6 and 7. The invention accordingly proposes a procedure wherein, with use of entry and exit elements with sharp boundaries between the zones, the image of the entry elements superimposed upon the exit element is blurred by deliberate defocusing.

Figure 13:
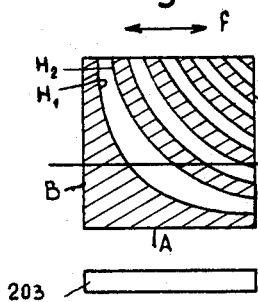

FIG. 13 illustrates an entry or exit device in which the zone-bounding curves are branches of equilateral hyperbolae $H_1$, $H_2$ etc. with semi-asymptotes A and B, the device preferably being so used that a semi-asymptote is parallel to the basic direction which is made parallel to the spectrum-spread direction diagrammatically indicated again by the arrow $f$. The sections cut off by the hyperbolae $H_1$ and $H_2$ on any straight line D parallel to the spectrum-spread direction are equal to one another and to the length of the section cut off by the intersections of hyperbolae $H_1$ and of asymptote B with the straight line D. The edges of the device are the semi-asymptotes A and B and sides parallel thereto, advantageously so as to form a square. The zone bounded by the asymptotes A, B, the hyperbolae $H_1$ and the other two sides is, for instance, a non-transmitting zone. Associated with this square of hyperbolic patterns is a transmission-correcting surface 203 of an area equal to the difference between the surfaces of the non-transmitting zones and the surfaces of the transmitting zones of the quadrant.

Figure 14:
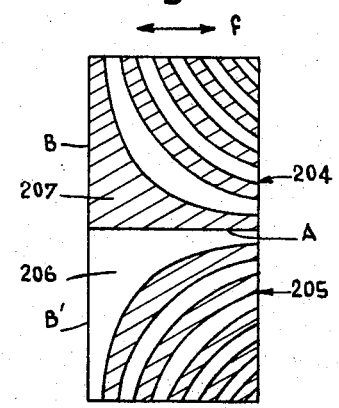

FIG. 14 diagrammatically illustrates an entry or exit device comprising a first quadrant 204 having hyperbolic patterns as in the embodiment just described, with which is juxtaposed a quadrant 205 geometrically symmetrical thereto relatively to the asymptote A; zone 206 of quadrant 205 is bounded by the asymptote A and the semi-asymptote B' and belongs to a set other than the set to which the zone 207 of quadrant 204 belongs, zone 207 being bounded by the semi-asymptote A and the other semi-asymptote B, the device therefore maintaining the condition of equality between the areas of the two sets of zones without needing any correcting surface.

Figure 15:
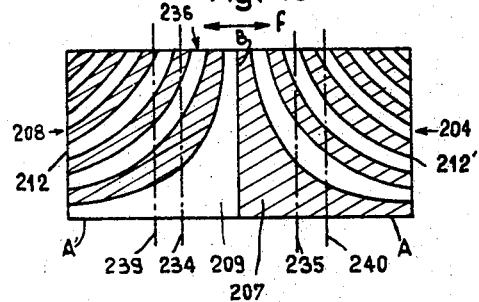

In the modification illustrated in FIG. 15, a quadrant 204 such as forms part of the device illustrated in FIG. 14 is placed adjacent—but on the other side of the semi-asymptote B—a second quadrant 208 with a symmetrical arrangement of the zone-bounding curves; in the embodiment illustrated there, the zone 209 adjacent the zone 207 of the quadrant 204 is a transmitting zone.

In the embodiment of FIG. 16 the semi-asypmtote B is not a zone boundary. From a hyperbola $K_1$, which is considered as directrix curve, a section $d_1$–$d_2$ equal to twice the section $d_0$–$d_1$ ($d_0$ denoting the intersection of the straight line D with a semi-asymptote B) is marked off along any straight line D parallel to the basic direction, then another section $d_2$–$d_3$ equal to the section $d_1$–$d_2$ is marked off and so on; a similar marking-off is effected on the other side, the sections $d_1$–$d'_1$ being equal to the section $d_1$–$d_2$, $d'_1$–$d'_2$ and so on. In this embodiment, the various zone-bounding branches of equilateral hyperbolae cut off equal sections along straight lines perpendicular to the spectrum spread direction, except for the section disposed between the hyperbola branch nearest the asymptote parallel to the spectrum spread direction and the latter asymptote itself. A transmission-correcting surface is provided in this case.

If the lines A and B in FIG. 13 are taken respectively, as the $x$ and $y$ axes of a co-ordinate system, the hyperbolic curves $H_1$, $H_2$ etc. can be expressed by the general formula $xy=n$ where $n$ represents consecutive integers 1, 2 and so forth. For any line D of ordinate $y$, therefore, the sections marked off by any two consecutive curves $H_{n-1}$, $H_n$ will have the length $1/y$, the magnitude of this length as a function of $y$ being thus equal to that of $x$ in the expression $x=1/y$ which defines the first curve $H_1$. In the pattern shown in FIG. 16, on the other hand, the integer $n$ assumes only odd values as will be apparent from a comparison of the two figures; here, therefore, the length of a section delimited on line D by any two consecutive curves equals $2/y$, being thus twice the value of the function $x=1/y$ which defines the first curve $K_1$. Thus, FIGS. 13 and 16 illustrate two specific examples of the general relationship expressed above with reference to the length of a section as a function of its distance ($y$) from a reference line (A), this function corresponding to the function ($x=1/y$) of a directrix curve ($H_1$ or $K_1$) multiplied by a constant which has the value "one" in FIG. 13 and "two" in FIG. 16.

The embodiment illustrated in FIG. 17 is derived from the embodiment illustrated in FIG. 12 by symmetry around the asymptote A–A'; a zone 210 bounded by the asymptote A–A' and the hyperbolae $K_1$, $K'_1$ belongs to a first set, while a symmetrical zone 210' bounded by branches of hyperbolae $k_1$, $k'_1$ is part of the other set of zones of the device; in this embodiment no corrective surface is necessary.

A description will now be given of embodiments of entry and exit devices designed to minimize any maladjustments of the spectrometer of an accidental or permanent nature, the effect of such devices being that the entry-device image projected by the intervening optical components of the spectrometer is offset perpendicularly to the spectrum-spread direction relatively to the exit device. This improved form of an entry or exit device will be described first for the embodiment illustrated in FIGS. 6 and 7 and in FIG. 18.

The effect of incorrect positioning can be reduced considerably by constructing an entry or exit element, for instance, from the element shown in FIG. 18, by cutting it off along the straight lines 222, 223 that are perpendicular to the spectrum-spread direction $f$ and symmetrical relatively to the asymptote 219. The sensitivity to this positional maladjustment is reduced $n$ times for straight lines 222, 223 which are cut by two consecutive hyperbolae into sections, such as $g$–$h$, which are $n$ times as great as the sections $j$–$l$ cut off on the side edges 212, 212' by two consecutive hyperbolae. An entry or exit element thus modified is illustrated in FIG. 19; its resolving power, which depends upon the length of a section, such as $a_0$–$a_1$ (FIG. 18) cut off on the side 211 or 213 by two consecutive hyperbolae, is the same as the resolving power of the entry of exit element shown in FIG. 18.

The invention also provides an embodiment of an entry or exit device, whose sensitivity to incorrect positioning is considerably less than the sensitivity in this respect of any entry or exit element of the kind shown in FIG. 18, yet which has a square or substantially square shape allowing more of the field of the spectrometer to be used than does an elongated rectangular shape of the kind shown in FIG. 19, with the result of increased luminosity. To this end, according to this aspect of the invention, a number of strips are juxtaposed perpendicularly to the spectrum-spread direction arising out of the trimming (as hereinbefore described) of an entry or exit element of the kind shown in FIG. 18 or of other embodiments hereinbefore described, means being provided to obviate the disadvantages of the presence, in any entry and/or exit element, of portions repeating identically by a shift in a direction parallel to the spectrum spread direction.

In a preferred embodiment of this type, a substantially square entry or exit element is provided by juxtaposing by their large sides a number of strips, such as the one designated 230, bounded by the lines 222, 223 and shown in FIG. 19, and by staggering the strips relatively to one another in the direction perpendicular to the spectrum-spread direction. It has been found that a stagger of five to ten times the length of the sections cut off by the consecutive hyperbolae along a long side of a strip such as 230 provides a spectrometric analysis which is as satisfactory as that provided by a device as shown in FIG. 18, but with reduced sensitivity to maladjustment.

In the embodiment illustrated by way of example in FIG. 20, the entry or exit device is produced by juxtaposing three strips $230_1$, $230_2$, $230_3$ which are mutually identical and relatively staggered in height. In one particular example, which is given non-limitatively, the device was a square with a side of 30 millimeters, the sections cut off by the consecutive hyperbolae on a top or bottom edge of the strips were 0.05 mm. long, the sections cut off on the vertical marginal sides 222 or 223 by consecutive equilateral hyperbolae were 0.15 mm. long, and the vertical staggering between two consecutive strips was 0.75 mm.; this staggering may also be greater, e.g. 1.5 mm. or even more. To simplify the drawing, the curves visible in FIG. 20 have been shown with a relative spacing considerably greater than that corresponding to the aforestated numerical ratio.

In practical embodiments additional trimming can be performed along the horizontal lines 232 and 233 by clipping the projecting top and bottom steps to provide an entry or exit element having a square or rectangular contour.

In the modification of FIG. 21 I start from an entry or exit element of the kind shown in FIG. 15. This element is clipped along straight lines 234, 235 parallel to the asymptote B and symmetrical thereto so as to bound a central strip 236. Three such strips $236_1$, $236_2$, $236_3$ are juxtaposed in FIG. 21 and are staggered in height, as hereinbefore described; if required, further trimming, along the straight lines 237, 238 parallel to the spectrum spread direction, can be carried out to provide a rectangular contour element.

FIG. 22 illustrates another modification wherein the starting element is the same as in FIG. 15 and the clippings are made along straight lines 239, 240 which are perpendicular to the spectrum-spread direction and extend centrally between the common asymptote B and the sides 212 and 212', the resultant central portions 241 (FIG. 22) being square.

In another modification shown in FIG. 23, I start with a quadrant, for instance, the quadrant 204 as shown in FIGS. 14 and 15, and clipped along a straight line 242 perpendicular to the spectrum-spread direction $f$, the line 242 being distant from the asymptote B by a length such as to cut off on the consecutive hyperbolae sections of a length which is a predetermined multiple of the length of the sections cut off by the consecutive hyperbolae on the side 212'. The entry or exit element is completed by a correcting surface 243 which has the same width, in the spectrum-spread direction, as the entry or exit element proper and whose height gives the spectrometrically effective surface an area such as to restore equality between the areas of the two sets of zones.

The invention provides other means for preventing coincident superimpositioning of constituent strips of an entry or exit element by a movement parallel to the spectrum-spread direction, for instance, angular offsetting of the hyperbolae of one strip relatively to the hyperbolae of another strip. A corresponding embodiment is illustrated in FIGS. 24 and 25. FIG. 24 illustrates an entry or exit element of the kind shown in FIG. 18. A strip 230, similar to the strips used for the embodiments illustrated in FIGS. 19 and 20, is first marked off on such element by the straight lines 222, 223 perpendicular to the spectrum-spread direction. On a second element having the same hyperbolae as those shown in FIG. 18, a first pair of parallel straight lines 250, 251, slightly inclined relatively to the straight lines 222, 223, are traced from the points $r$ and $s$ of intersection of the straight lines 222 and 223 with the asymptote 218, and on a third element having the same pattern, two further parallel straight lines 252, 253 which are symmetrical of the straight lines 250 and 251 relatively to the straight lines 222 and 223, respectively, are traced from the points $r$ and $s$. The lines 250 and 251 bound a central strip 254, and the straight lines 252 and 253 bound a central strip 255. The entry device is constructed by juxtaposing the strip 254 with one side of the central strip 230, the edge 251 being contiguous with the edge 223, while on its other side the central strip 230 is juxtaposed with the strip 255, the edge 252 being contiguous with the edge 222. The resultant entry or exit element is as shown in FIG. 25 and can be trimmed in order to have a square or rectangular shape as shown by the dot-dash lines. In practice, appropriate lateral strips can be defined by an inclination of a few degrees relatively to the perpendicular to the spectrum spread direction.

The invention further provides embodiments as just described but based on elements of the kind shown in FIGS. 13, 14 and 15. If required, a number of elements as hereinbefore described can be juxtaposed, the juxtaposed side being parallel to the spectrum-spread direction.

In the embodiment illustrated in FIG. 26, there is shown by way of example an entry or exit device produced by juxtaposing, in the direction perpendicular to the spectrum-spread direction, two identical entry or exit elements as shown in FIGS. 6 and 7 or in FIG. 18. Other embodiments can be provided by similarly juxtaposing elements such as those illustrated in FIGS. 17 and 20. A greater number of entry or exit elements can be juxtaposed, if required. Starting from a device obtained by juxtaposing a number of entry or exit elements as shown in FIG. 26 an entry or exit device of greater surface area (not shown) could be prepared by juxtaposing two such devices in the spectrum-spread direction, the two juxtaposed elements being staggered in height as hereinbefore set forth.

When a device as shown in FIG. 26 is used as the corresponding entry device, a device as shown in FIGURE 27 can be used as exit gate. The exit device illustrated in FIG. 27 is superimposed in coincidence on the entry-device image projected, at the control wave length; by the optical components of the apparatus which are between the entry and exit devices. However, in this exit device, which comprises two parts 260, 261, the part 260 is such that any of its zones registering with the image of a corresponding zone of the entry device is of the same nature as the last-mentioned zone; for instance, if it is in coincidence with an image of an opaque zone, it is opaque, and if it is in coincidence with the image of a transparent zone of the entry device, it is transparent. In the other half of the exit device—i.e., the zone 261—any zone coincident with an entry-zone image is of opposite nature to the entry zone, being transparent when the corresponding entry zone is opaque, and opaque when the corresponding entry zone is transparent. With a spectrometer having an entry device and an exit device of the kind just described, a beam of incident radiation passing through the entry device is divided into two secondary beams each containing half of the energies, of any wavelength, carried on the incident beam; the secondary beam which is incident on the part 260 of the exit device gives rise to a set of outgoing pencils carrying all the energy transmitted by the first secondary beam on the control wavelength—i.e., one quarter of the energy incident on such wavelength—and one-eighth or less of the incident energies on each of those wavelengths other than the control wavelength which issue from the exit device. On the other hand, the set of pencils issuing from the part 261 of the exit device and coming from the other secondary exit beam contain no energy on the control wavelength and only have energies equal to those carried on the first set of pencils on each of the said other wavelengths. The spectrometric signals is produced by comparison of the two sets of pencils issuing from the respective parts 260 and 261.

An arrangement of this kind is of use whenever an entry device comprises two identical parts adapted to be superimposed one upon the other by a movement perpendicular to the spectrum-spread direction and whenever the exit device comprises two parts respectively aligned with the images of the two parts of the entry device as produced by the spectrometer on the control wavelength, only one of the two parts of the exit device differing in the character of its zones relatively to those of the image of that part of the entry device with which it registers.

In FIG. 28 there can be seen an entry or exit device which is similar to that shown in FIG. 26 but whose constituent elements have had their corners cut off along sides 244–247 in one element and 244'–247' in the other element, to reduce secondary peak amplitudes as shown in FIG. 8. This step can be used in the various entry or exit devices hereinbefore referred to. For instance, a device having the contour shown in FIG. 29 can be provided by cutting corners off the device illustrated in FIG. 20.

Alternatively, the corners can be cut off merely of the complete assembly, in which case a device having the contour shown in FIG. 30 results. The invention further provides embodiments as hereinbefore described but starting from an element of the kind shown in FIG. 17. Of course, for the sake of clarity the number of curves illustrated for each of the elements or devices that very much less than is used in actual practice. To give an example of the density which can be given to the curves bounding the alternate zones of different transmissivity in the optical elements according to the invention, FIG. 52 illustrates a photographic reduction to regulation size, on a scale of about 1:3, of an example of a grating of equilateral hyperbolae produced by a graphic process (although any other method could also be used) from which the embodiments of the elements according to the invention comprising equilateral hyperbolae were prepared by photographic montage and reduction processes. The element illustrated in FIG. 6 and the elements derived, as hereinbefore described, from FIG. 6 and illustrated in FIGS. 10 and 12 are prepared from this large scale network of equilateral hyperbolae. Elements of the kind shown in FIGS. 6, 10 and 12 were used to record the graphs as shown in FIGS. 49–51. The element shown in FIG. 6 was prepared by a reduction to about one-fiftieth from the large-scale network of equilateral hyperbolae.

For a 10° rotation of the dispersing system from 30 to 40°, the control wavelength changes from 30,000 to 37,520 angstroms. The graphs partly shown in FIGS. 50 and 51 are actually 60 meters long, scanning at the wavelength hereinbefore mentioned corresponding to this length.

Reference will now be made to FIG. 31 which shows a modification of the apparatus illustrated in FIG. 1. In this embodiment, a mirror 50 directs flux from a source S onto an entry element 51 of a construction similar to that of the element 31 of FIG. 1 except that the zones which are reflecting in the element 31 are non-transmitting zones in the element 51. The element 51 converts the incident beam 52 into a plurality of pencils 53 which correspond to its transmission zones, and the pencils 53 are reflected by a concave mirror 54 onto the dispersing system P formed by a grating. The dispersed pencils 55 produced by the grating P are reflected by the mirror 54 onto an exit element 56 which, on the control wavelength, registers with the entry-element image passing through the spectrometer and which is therefore similar to the exit element 37 of the embodiment illustrated in FIG. 1 except that the opaque zones of the exit element 37 are replaced by zones in the exit element 56 of the embodiment illustrated in FIG. 31. The exit element 56 therefore distinguishes transmitted pencils 57 and reflected pencils 58 which, after reflection on concave mirrors 59, 60 respectively, reach an apertured rotating disc 21 similar to that shown in FIG. 2; the reflecting parts 23 of the disc 21 direct the pencils 58 as pencils 61 to a receiver R, while the pencils 57 pass thereto through the peripheral gaps 24 (FIG. 2) in the disc 21. This embodiment operates similarly to the embodiment described with reference to FIGS. 1 and 2.

Reference will now be made to FIG. 32 which illustrates an embodiment similar to the embodiment illustrated in FIG. 31 except that the pencils 57 are permanently incident upon one half $r'$ of a differential receiver R', while the pencils 58 are incident on the other half $r'_1$ of the receiver R', the rotating disc 21 being omitted. The differential receiver R' gives a direct indication of the difference between the energies carried by the pencils 57 and 58 reaching it.

The invention also covers variants of the apparatus illustrated in FIGS. 31 and 32 wherein the zones which in the exit element are superimposed, at the control wavelength, upon the images of transparent zones of the entry element are not transparent zones, as in the embodiments hereinbefore described, but are reflecting zones, the non-transparent zones of the entry element having in this case images with which the transparent zones of the exit element coincide.

In the embodiments illustrated in FIGS. 33 to 35 there are present two "grids" $62^a$ and $62^b$, one of which is "complementary" to the other as diagrammatically illustrated in FIG. 34. In grid $62^a$ zone $Z_1^a$ is a transparent zone, $Z_2^a$ is an opaque zone and so on; zone $W_1^a$ is an opaque zone, $W_2^a$ is a transparent zone and so on. On the other hand, in grid $62^b$, zone $Z_1^b$ is an opaque zone, zone $Z_2^b$ is a transparent zone and so on; zone $W_1^b$ is a transparent zone, zone $W_2^b$ is an opaque zone, and so on. Appropriate means, diagrammatically denoted in FIG. 33 by reference 64, are adapted to render the two grids alternately operative in respect of the radiant flux emitted by the source S, for instance, by consecutively forming an image of the grids at the same place, as shown at 65. The pencils 66, 67 passing in alternate sequence through the two grids are after reflection on a concave mirror 68, applied to the dispersing system P which delivers dispersed pencils 69, 70; the same are reflected by the mirror 68 onto the exit "grid" 71 which is superimposed, within the meaning of the term as hereinbefore set forth, on the spectrometrically projected image of one or the other of the entry grids $62^a$ and $62^b$, for instance, of the entry grid $62^a$. The exit element 71, FIG. 35, therefore comprises a transparent zone $z_1$, adjacent which is an opaque zone $z_2$, and so on, and an opaque zone $w_1$, adjacent which is a transparent zone $w_2$, and so on. The pencils 72, 73 which pass in alternate sequence through the exit element 71 reach the receiver R. This embodiment operates similarly to the embodiments hereinbefore described.

In another embodiment illustrated in FIGS. 36–38, a disc 74, visible in FIG. 38, is formed with radial recesses leaving an odd number of equidistant teeth 75 which are reflecting; this disc is rotatable around an axis 76 and faces the source S. Disposed on either side of the disc 74 is a grid of the kind hereinbefore described, i.e., a grid $77^a$ (FIG. 36) and a grid $77^b$ (FIG. 37) which "complement" one another. These grids are illustrated in diagrammatic form in FIGS. 39 and 40. The grid $77^a$, shown in FIG. 39, comprises a first quadrant with a reflecting zone $Z_1^a$, an opaque non-reflecting or transparent zone $Z_2^a$, and so on; a second quadrant with an opaque or transparent zone $W_1^a$, a reflecting zone $W_2^a$, and so on; a third quadrant with an opaque or transparent zone $Z'_1^a$, a reflecting zone $Z'_2^a$, and so on; and a fourth quadrant with zones $W'_1^a$ etc. similar to those of the diagonally adjoining first quadrant. Complementarily the grid $77^b$, which is shown in FIG. 40, comprises a first quadrant with a transparent or non-reflecting opaque zone $Z_1^b$, a reflecting zone $Z_2^b$, and so on; a second quadrant with a reflecting zone $W_1^b$, a transparent or opaque zone $W_2^b$, and so on; a third quadrant with a reflecting zone $Z'_1^b$, and so on; and a fourth quadrant with a reflecting zone $W'_2^b$, and so on. Of the beam 80, grid $77^a$ transmits reflected pencils 81 (FIG. 36) which, after reflection on a concave mirror 82, are dispersed into pencils 83 by the dispersing system P, for instance, a diffraction grating, and are then incident upon the exit element 84. The same coincides with the positive or negative image of the element $77^a$ i.e., in one case its reflecting zones coincide with the images of the reflecting zones of the element $77^a$, whereas in the other case they coincide with the images of the opaque non-reflecting or transparent zones of the element $77^a$. The parts 89 of the pencils 85 which are reflected by the exit element 84 reach the receiver R. When, as shown in FIG. 37, the beam 79 from the source S passes through a gap between two teeth 75 of the rotating disc 74, this beam reaches the grid $77^b$ whose reflecting parts generate pencils 86 which are reflected by a tooth 75 of the disc 74 in the form of pencils 87 towards the mirror 82, then towards the dispersing system P which converts them into dispersed pencils 88 which, after further reflection on the mirror 82, reach the exit element 84 whose reflecting parts deliver beams 89 to the receiver R.

A modification of this embodiment is illustrated in FIG. 41 in which the operative parts of the exit element 90, instead of being the reflecting parts as in the previous embodiment, are the transparent parts. The pencils 91, 91' which pass through the exit element 90 reach the receiver R.

In the embodiment illustrated in FIG. 42, an entry element 92 of the kind shown in FIG. 43 is used and comprises two parts 93, 94 which are symmetrical in their contours and in their zone-bounding curves and each of which can be of square or rectangular form, as shown, their confronting edges 95, 96 being adjacent or very close to one another. The parts 93, 94 are formed by the top and bottom halves of an entry element of the kind shown in FIG. 6, the zone $Z_1$ of the top part 93 being transparent and the zone $Z_2$ being opaque, and so on, the zone $W_1$ of the bottom half 94 being opaque and the zone $W_2$ being transparent and so on. The operative zones of the entry element are the transparent zones, i.e. the zones which transmit the flux. These zones convert an entry beam 97 into pencils 98 which, after a first reflection on a concave mirror 99, diffraction on the grating P forming the dispersing system and a second reflection on the mirror 99, reach the exit element 101. The same comprises two parts 102, 103. The part 102 coincides with the image of the entrance-gate half 93 projected by the spectrometer; its zone $z_1$ (FIG. 44) is an opaque zone, while its zone $z_2$ is a transparent zone, and so on. On the other hand, the part 103 of the exit element 101 coincides with the "complementary" image of the half 94 of the entry element 92, i.e., the zone $w_1$ is an opaque zone, the zone $w_2$ is a transparent zone, and so on. Some of the dispersed pencils 104 pass through the top half (as viewed in FIG. 42) 102 of the exit element and are converted thereby into pencils 105, which, after reflection on a concave mirror 106 and on a concave mirror 107, are applied to the receiver R in alternate fashion by passing through a toothed disc 109, for instance, of the kind shown in FIG. 2. Of the other portion of the pencils 104, the bottom half 103 of the exit element creates pencils 110 which, after reflection on a flat inclined mirror 111 and a concave mirror 111', are reflected by the teeth 112 of the disc 109 and are applied alternately to the receiver R.

The embodiment illustrated in FIG. 45 can be used in any of the devices hereinbefore described. The entry device 120 is formed by a grid element 121 similar to those hereinbefore described, comprising, for instance, transmission zones and non-transmission zones bounded by hyperbolae, the contour of the element being a square having sides 122–125. In this embodiment the entry device also comprises, adjacent or near the element 121, a rectangular window or aperture 126 of an area equal to 25% of the area of the square, for instance, because the long sides 127, 128 of the rectangle are equal to the sides of the square whereas the short side 129, 130 are one-quarter of the side of the square. The exit device 131 comprises a grid element 132 which coincides, with or without complementation, with the monochromatic image of the element 121, as projected through the apparatus, and is also formed with a window 133 which coincides with the image of the window 130 transmitted through the apparatus. To provide a spectrometric signal, the light flux transmitted through the exit element 132 is compared with the light flux transmitted through the window 133. If the exit element 132 comprises transparent parts and reflecting parts, a signal can be provided by comparison of the flux pressing through the window 133 either with the flux through the element 132 or with the flux reflected thereby.

A spectrometric apparatus according to this embodiment is of very simple construction but, ceteris paribus, has a luminosity which is less than that of the other embodiments according to the invention, although still greater than the luminosity of conventional systems.

FIG. 46 illustrates one procedure for selecting flux provided by an exit element G', which receives dispersed pencils 135 and converts the same into transmitted pencils 136 and reflected pencils 137. After reflection on mirrors 138 and 139, the respective pencils are applied continuously to collectors 140, 141 giving electrical indications which are supplied to an electronic signal-comparison circuit 142 known per se.

In the embodiment illustrated in FIGS. 47 and 48, a rotating disc of the kind denoted by the reference 144, comprising transparent or empty parts 145 and reflecting parts 146, is placed on the common portion of the pencils 136 and 137 generated as in the previous embodiment. The pencils 137 pass through a space 145 of the disc 144 and are applied to a receiver or collector 147, whereas the pencils 136 are applied thereto after reflection by a reflecting part 146. The collector 147 therefore receives seriatim the energy carried by the pencils 137 and the energy carried by the pencils 136. A signal equal to the difference between these two energies is derived by appropriate known means from the signal delivered by the collector 147, for instance, by an amplifier disposed beyond the collector and adjusted to the frequency at which a part 146 takes the place of a space 145.

A spectrometric apparatus according to the invention can satisfy very widely diverging practical requirements. Its luminosity leads to improved performances, being incomparably greater (e.g. by a factor of hundreds or even thousands) than in a conventional single-entry-slit and single-exit-slit apparatus. Considerable improvements as compared with a conventional slit apparatus can be provided by the apparatus according to the invention in one and/or the other of several characteristic qualities, namely the resolving power, the accuracy—i.e. the signal-to-noise ratio—and/or the scanning speed, without the improvement in any one of these qualities being to the detriment of any of the other.

In all cases, for any of the embodiments illustrated in FIGS. 9–11 and 13 and in FIGS. 20, 21, 25 and 28–30, the desired contour can be obtained either by cutting out the material of the entry and exit elements or by providing an appropriately shaped mask. One mask can be placed in contact with the entry element and another mask can be placed in contact with the exit element.

Instead of a mask being placed in contact with the entry element, a mask can be placed in any plane containing an image thereof, the contour of such mask being the contour of the image which that part of the apparatus which is above such plane would provide of the appropriate mask placed in the plane of the entry element. If the apparatus comprises two entry elements and means for forming a common image thereof, the mask can be disposed in the plane of such common image.

In all the embodiments of the entry and exit elements according to the invention, the reduction in the secondary maxima of curves of the kind shown in FIG. 8—as, for instance, curves representing the intensity of the signal provided by an apparatus illuminated by a monochromatic light when the position of the dispersing system is varied (wavelength scanning)—is rapid and not limited, i.e., the secondary maxima tend towards zero, reach it and remain at it, this being a useful property for many practical uses and one which helps to widen the general range of use of spectrometric apparatus.

I claim:

1. An optical element adapted to be used as a gate for radiant flux in spectrometric apparatus, comprising a flat body with a surface divided into two sets of zones of different transmissivity for said flux alternating along said surface, the combined area of one set of zones being substantially equal to that of the other, said zones being separated from one another by boundary curves of generally hyperbolical shape divided into a first group with relatively wide spacing along a predetermined direction between successive curves, a second group remote from said first group with relatively narrow spacing along said direction between successive curves, and an intervening third group wherein the spacing of the curves along said direction ranges between said relatively wide and said relatively narrow spacing.

2. An optical element adapted to be used as a gate for radiant flux in spectrometric apparatus, comprising a flat body with a surface divided into two sets of zones of different transmissivity of said flux alternating along said surface, the combined area of one set of zones being substantially equal to that of the other, said zones being separated from one another by boundary curves of generally hyperbolical shape divided into a first group with relatively wide spacing along a predetermined direction between successive curves, a second group remote from said first group with relatively narrow spacing along said direction between successive curves, and an intervening third group wherein the spacing of the curves along said direction ranges between said relatively wide and said relatively narrow spacing and decreases progressively from the spacing of said first group to that of said second group.

3. An optical element adapted to be used as a gate for radiant flux in spectrometric apparatus, comprising a flat body with a surface divided into two sets of zones of different transmissivity for said flux alternating along said surface, the combined area of one set of zones being substantially equal to that of the other, said zones being separated from one another by boundary curves of generally hyperbolical shape divided into a first group with relatively wide spacing along a predetermined direction between successive curves, a second group remote from said first group with relatively narrow spacing along said direction between successive curves, the ratio of maximum to minimum spacing in said first and second groups being on the order of at least 100:1, and an intervening third group wherein the spacing of the curves along said direction ranges between said relatively wide and said relatively narrow spacing and decreases progressively from the spacing of said first group to that of said second group.

4. An optical element adapted to be used as a gate for radiant flux in spectrometric apparatus, comprising a flat body with a surface divided into two sets of zones of different transmissivity for said flux alternating along said surface, the combined area of one set of zones being substantially equal to that of the other, said zones being separated from one another by boundary curves which, within at least a part of said surface, are separated from one another along lines parallel to a predetermined reference line by intervals decreasing with increasing distance from said reference line, said curves forming substantially equidistant intersections with any one of said parallel lines.

5. An element as defined in claim 4 wherein the length of said intervals varies as a function of distance from said reference line according to an expression corresponding to the function of one of said curves multiplied by a constant.

6. An optical element adapted to be used as a gate for radiant flux in spectrometric apparatus, comprising a flat body with a surface divided into two sets of zones of different transmissivity for said flux alternating along said surface, the combined area of one set of zones being substantially equal to that of the other, said zones being separated from one another by boundary curves which, within at least a part of said surface, are separated from one another along lines parallel to a predetermined reference line by intervals decreasing with increasing distance from said reference line, said curves having a generally hyperbolical shape approaching said reference line substantially asymptotically.

7. An element as defined in claim 6 wherein said curves approach substantially asymptotically another line generally transverse to said reference line.

8. An optical element adapted to be used as a gate for radiant flux in spectrometric apparatus, comprising a flat body with a surface divided into two sets of zones of different transmissivity for said flux alternating along said surface, the combined area of one set of zones being substantially equal to that of the other, said zones being separated from one another by boundary curves which, within at least a part of said surface, are separated from one another along lines parallel to a predetermined reference line by intervals varying non-linearly with distance from said reference line by curves having a generally hyperbolical shape approaching said reference line substantially asymptotically and forming substantially equidistant intersections with any one of said parallel lines.

9. An element as defined in claim 8 wherein said curves are branches of equilateral hyperbolae having a common first asymptote coinciding with said reference line and a common second asymptote perpendicular to said reference line.

10. An element as defined in claim 9 wherein the width of said zones in a direction parallel to said reference line varies between a maximum and a minimum having a ratio on the order of at least 100:1.

11. An optical element adapted to be used as a gate for radiant flux in spectrometric apparatus, comprising a flat body with a surface divided into two sets of zones of different transmissivity for said flux alternating along said surface, the combined area of one set of zones being substantially equal to that of the other, said zones being separated from one another by boundary curves symmetrically distributed over an even number of juxtaposed regions of said surface, the curves within each region being of generally hyperbolical shape and separated from one another along lines parallel to a predetermined reference line by intervals decreasing with increasing distance from said reference line, said curves forming substantially equidistant intersections with any one of said parallel lines.

12. An element as defined in claim 11 wherein two of said regions share a common boundary line, the curves of said two regions being mirror-symmetrically disposed with reference to said boundary line and approaching said boundary line substantially asymtotically.

13. An element as defined in claim 12 wherein said boundary line is perpendicular to said reference line.

14. An element as defined in claim 13 wherein said reference line forms a common boundary for said two regions and is approached substantially asymptotically by all the curves thereof.

15. An element as defined in claim 14 wherein the curves of said two regions are branches of equilateral hyperbolae having a first common asymptote coinciding with said reference line and a second symptote coinciding with said bondary line.

16. An element as defined in claim 12 wherein said boundary line separates a zone of one set from a zone of the other set.

17. An element as defined in claim 11 wherein four of said regions form a joint outline and share a common point at the center of said outline, said point constituting the intersection of two mutually perpendicular boundary lines separating said four regions from one another, one of said boundary lines coinciding with the reference line of each of said four regions, the curves of said four regions being symmetrically disposed with reference to said point.

18. An element as defined in claim 17 wherein said curves approach said boundary lines substantially asymptotically.

19. An element as defined in claim 18 wherein said outline is substantially square.

20. An element as defined in claim 19 wherein said boundary lines extend parallel to the sides of the square.

21. An element as defined in claim 19 wherein said boundary lines extend diagonally of the square.

22. An element as defined in claim 18 wherein said outline has substantially the form of a square whose corners have been cut off by portions of said outline extending at an inclination to said boundary lines across areas of greatest density of said curves.

23. An element as defined in claim 22 wherein said outline is a hexagon with two sides perpendicular to said reference line.

24. An element as defined in claim 22 wherein said outline is an octagon with two pairs of sides respectively parallel to said boundary lines.

25. An element as defined in claim 22 wherein said outline is substantially in the form of a double Gaussian curve with two bell-shaped halves bisected by said reference line and turning their concave sides toward each other.

26. An element as defined in claim 18 wherein one pair of diametrically opposite zones adjoining said point are part of one set, the remaining pair of diametrically opposite zones adjoining said point being part of the other set.

27. An element as defined in claim 18 wherein said outline is generally rectangular, the major sides of the rectangle being perpendicular to said reference line.

28. An optical element adapted to be used as a gate for radiant flux in spectrometric apparatus, comprising a flat body with a surface divided into two sets of zones of different transmissivity for said flux alternating along said surface, the combined area of one set of zones being substantially equal to that of the other, said zones being separated from one another by boundary curves forming substantially identical but relatively displaced patterns in a plurality of adjoining regions of said surface, the curves of each pattern being of generally hyperbolic shape and separated from one another along lines parallel to a predetermined reference line by intervals decreasing with increasing distance from said reference line, said curves approaching substantially asymptotically said reference line and another line substantially perpendicular thereto.

29. An element as defined in claim 28 wherein each region is substantially a quadrangle with two parallel sides, adjoining regions having one of said parallel sides in common.

30. An element as defined in claim 29 wherein said reference line extends at right angles to said parallel sides in at least one of said regions.

31. An element as defined in claim 30 wherein each of said regions has a major dimension in the direction of said parallel sides.

32. An element as defined in claim 31 wherein said one of said regions is flanked by two other regions whose reference lines include with said parallel sides an angle of substantially less than 90°.

33. An element as defined in claim 31 wherein the patterns of adjacent regions are relatively staggered in the direction of said parallel sides.

34. An apparatus for the spectrometric analysis of a flux of radiation, comprising an entrance gate, an optical system disposed beyond said entrance gate for projecting an image of the latter at least at one predetermined location beyond said system, said system including dispersing means effective in a predetermined spectrum-spread direction, an exit gate of a configuration conforming to that of said entrance gate disposed at said location for alignment with the image of said entrance gate as projected by said system at a predetermined flux wavelength, and receiver means responsive to radiation transmitted by both said gates; each of said gates comprising a flat body with a surface divided into two sets of zones of different transmissivity for said flux alternating along said surface, the combined area of one set of zones being substantially equal to that of the other, said zones being separated from one another by boundary curves which, within at least a part of said surface, are separated from one another along lines parallel to a predetermined reference line by intervals decreasing with increasing distance from said reference line, said curves forming substantially equidistant intersections with any one of said parallel lines.

35. An apparatus as defined in claim 34 wherein a small difference exists between the combined areas of the two sets of zones in each of said gates, each gate being further provided with a supplemental surface portion of a size corresponding to said difference, the transmissivity of said supplemental surface portion being of the same character as that of the set of zones having the smaller combined area.

36. An apparatus as defined in claim 34 wherein the zones of each gate are arrayed within an area of said surface having the shape of a right-angled quadrilateral with a pair of sides parallel to said spectrum-spread direction.

37. An apparatus as defined in claim 36 wherein said curves include at least one family of branches of equilateral hyperbolae having common asymptotes parallel to respective sides of the quadrilateral.

38. An apparatus as defined in claim 36 wherein said surface further includes a rectangular window with major sides parallel to said spectrum-spread direction, the area of said window equalling one-fourth that of said quadrilateral.

References Cited

Girard: "Nouveauc Dispositifs de Spectroscopic a Grande Luminosite," Optica Acta, vol. 7, No. 1, January 1960, pp. 81–97, QC 350 05.

JEWELL H. PEDERSEN, *Primary Examiner.*

R. L. WIBERT, *Assistant Examiner.*